May 5, 1942.  E. F. ANDREWS  2,281,547
AUTOMATIC PHONOGRAPH
Filed Dec. 20, 1937   13 Sheets-Sheet 1

Inventor:
Edward F. Andrews,
By John F. Eakins
Attorney.

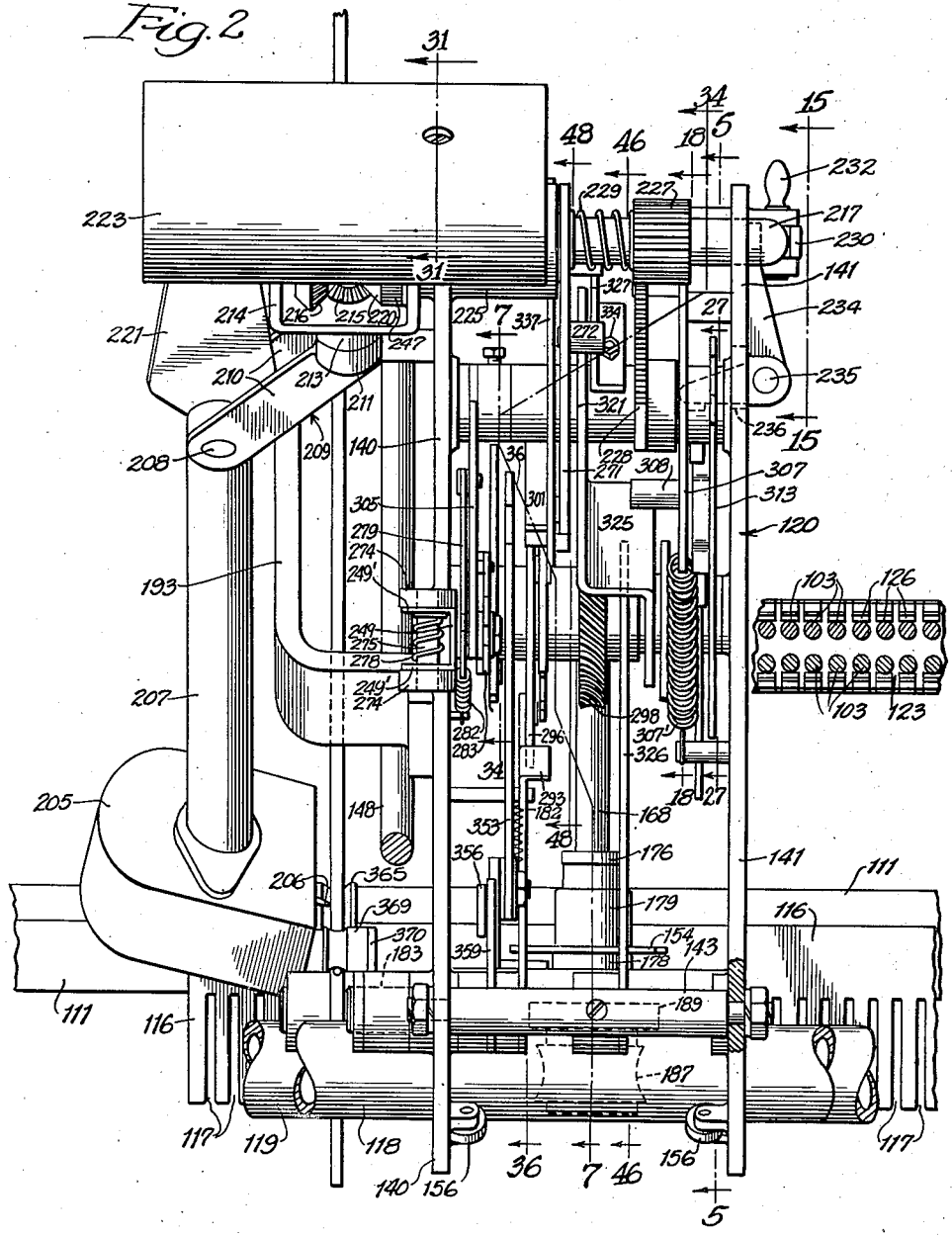

May 5, 1942.  E. F. ANDREWS  2,281,547
AUTOMATIC PHONOGRAPH
Filed Dec. 20, 1937  13 Sheets-Sheet 3
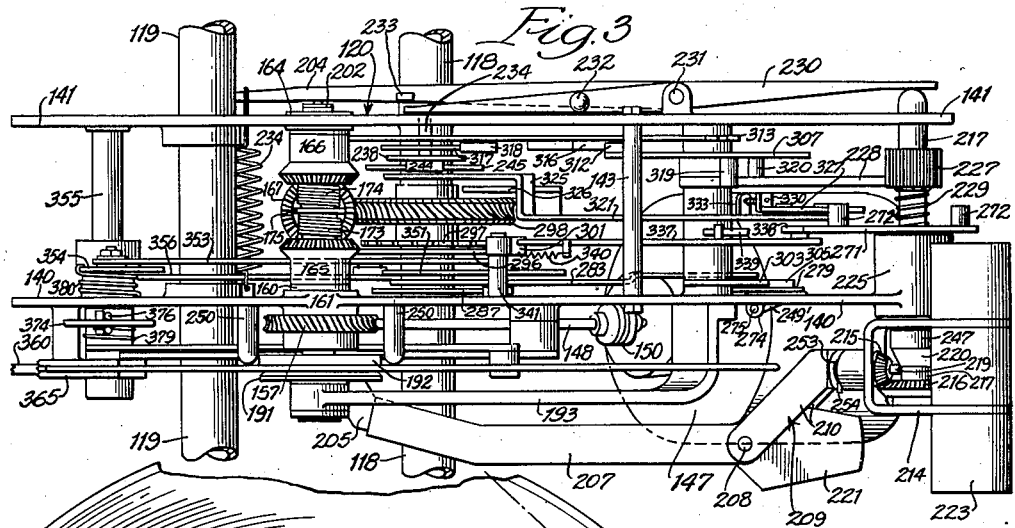
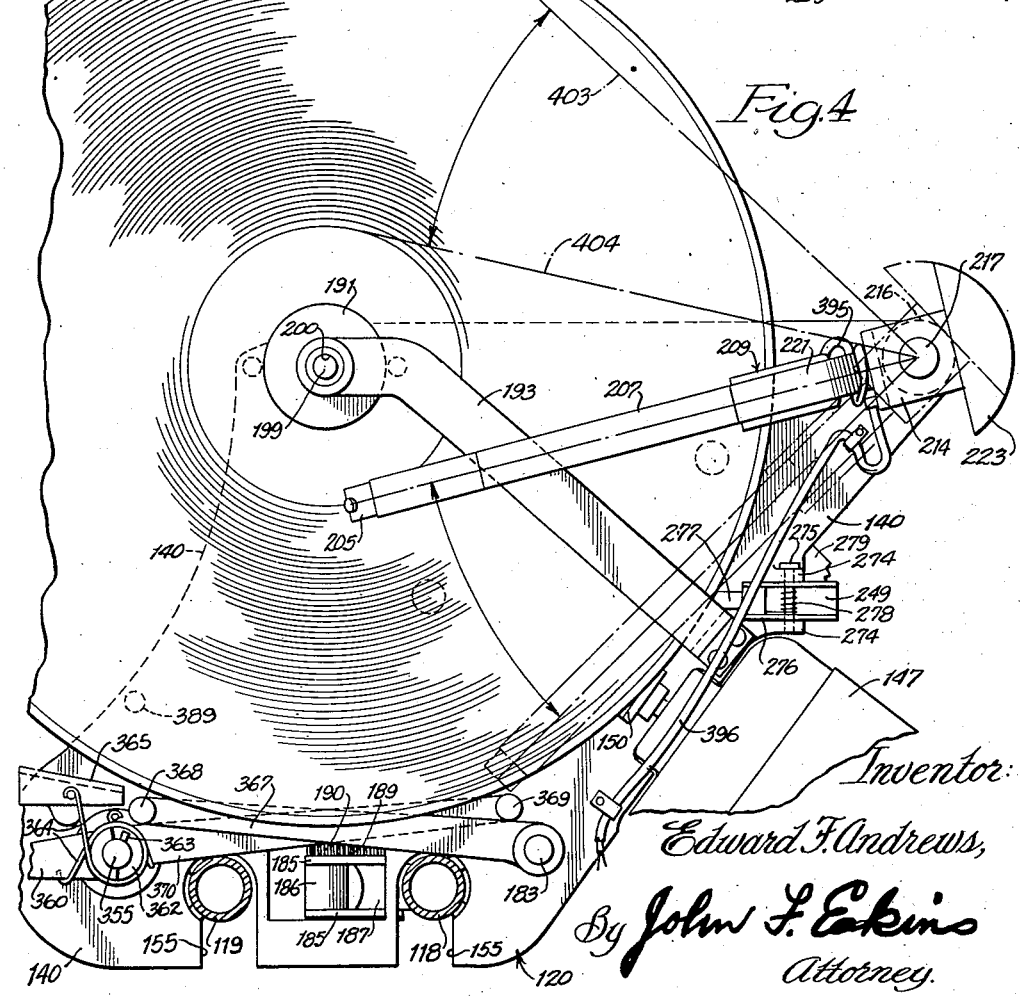
Inventor:
Edward F. Andrews,
By John F. Eakins
Attorney.

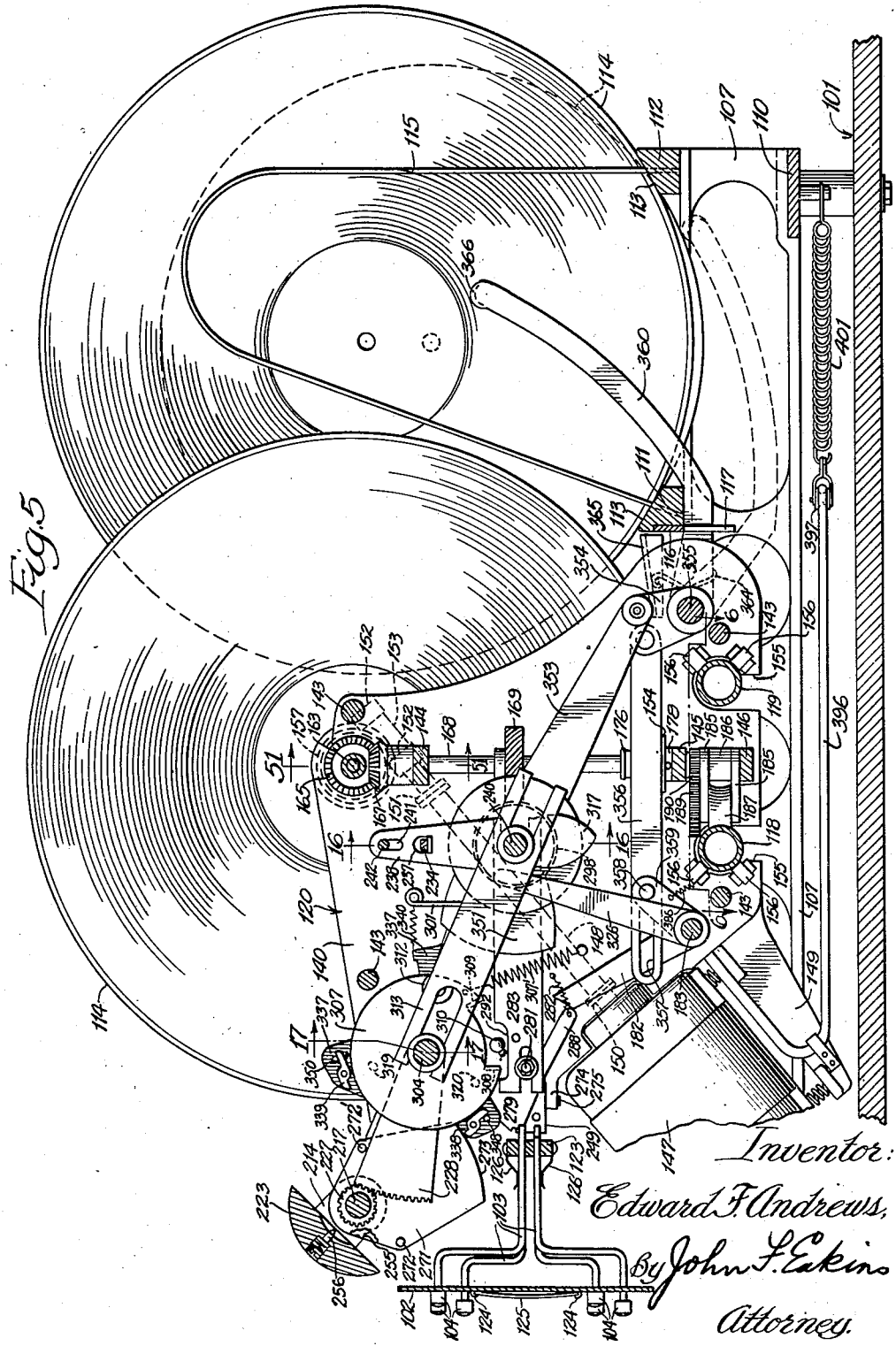

May 5, 1942.   E. F. ANDREWS   2,281,547
AUTOMATIC PHONOGRAPH
Filed Dec. 20, 1937   13 Sheets-Sheet 5
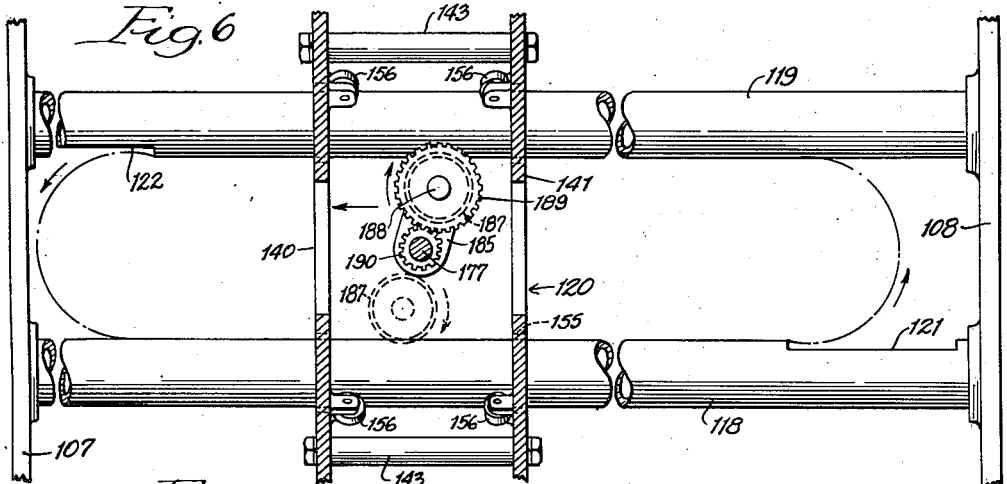
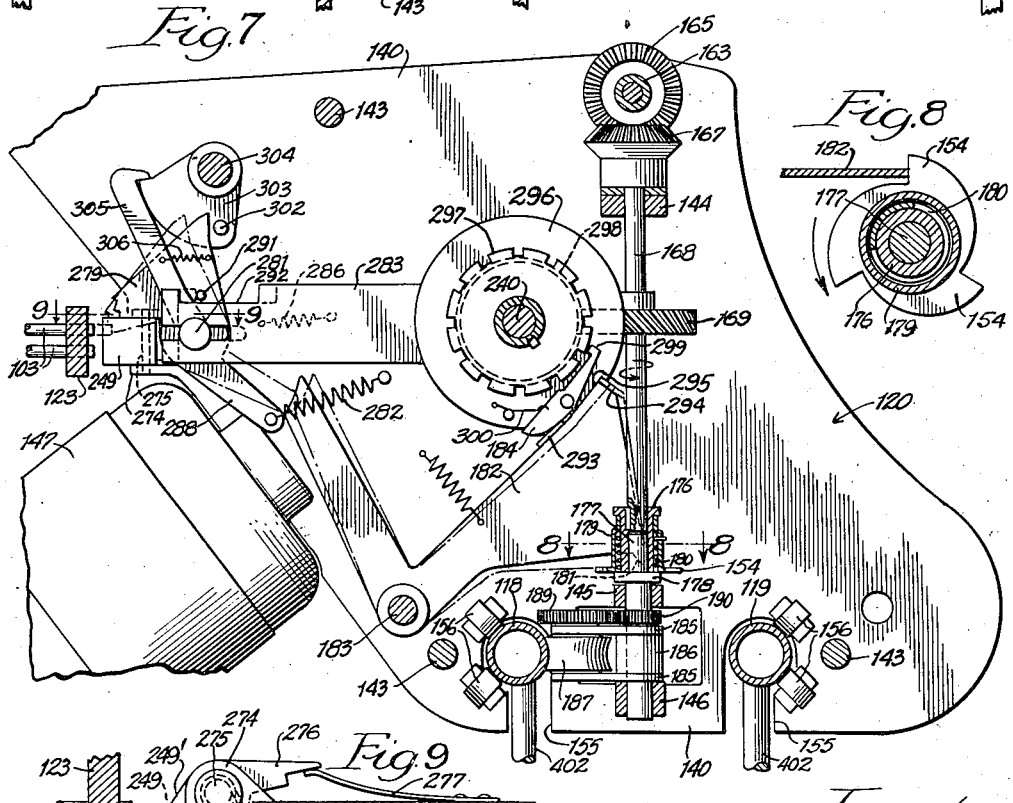
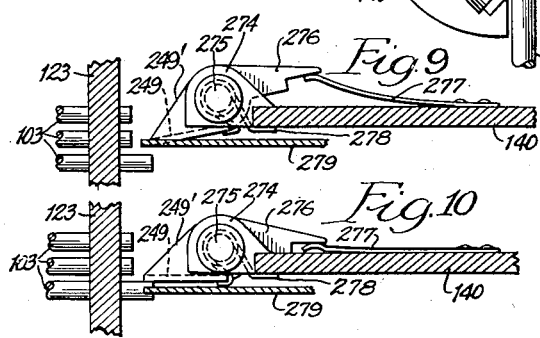
Inventor:
Edward F. Andrews,
By John F. Eakins
Attorney

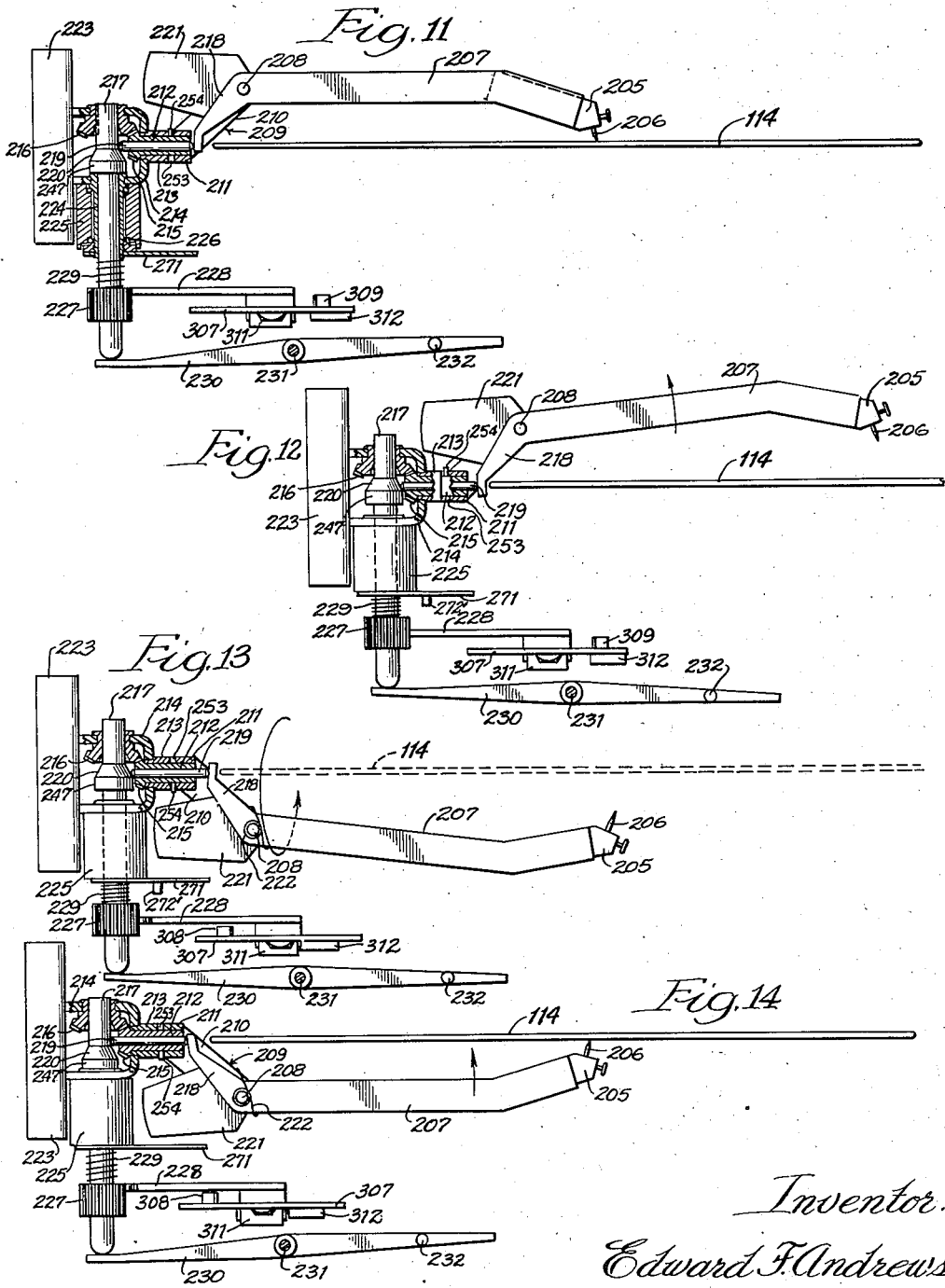

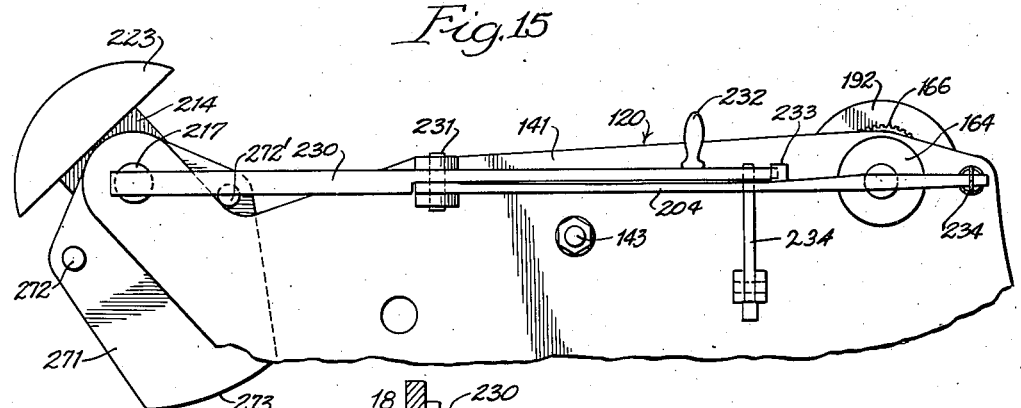
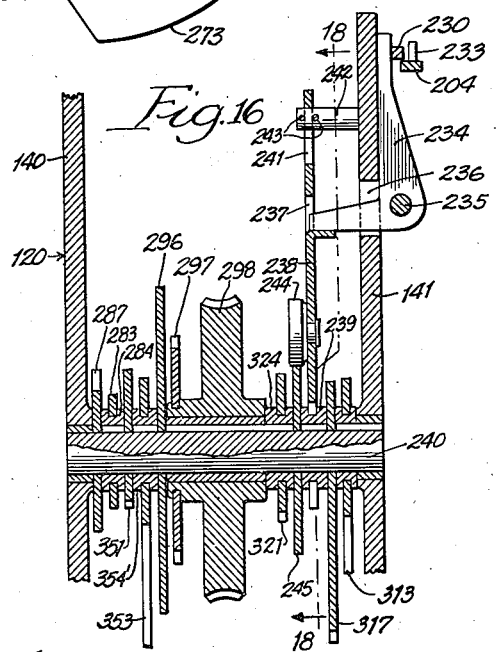
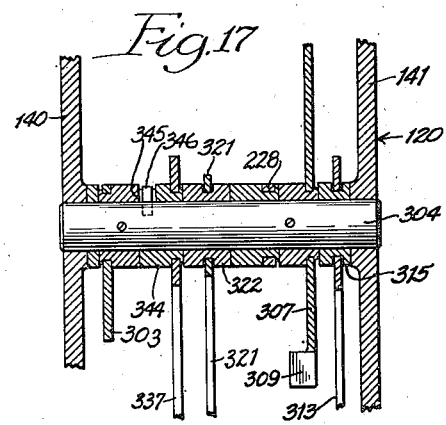
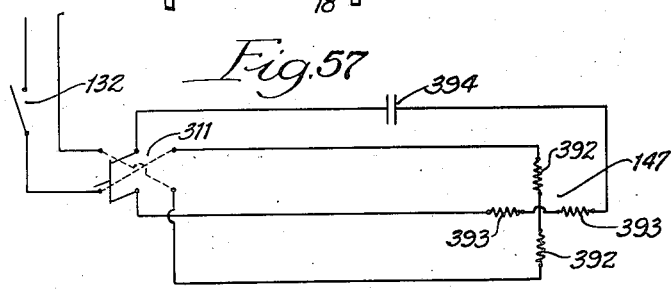

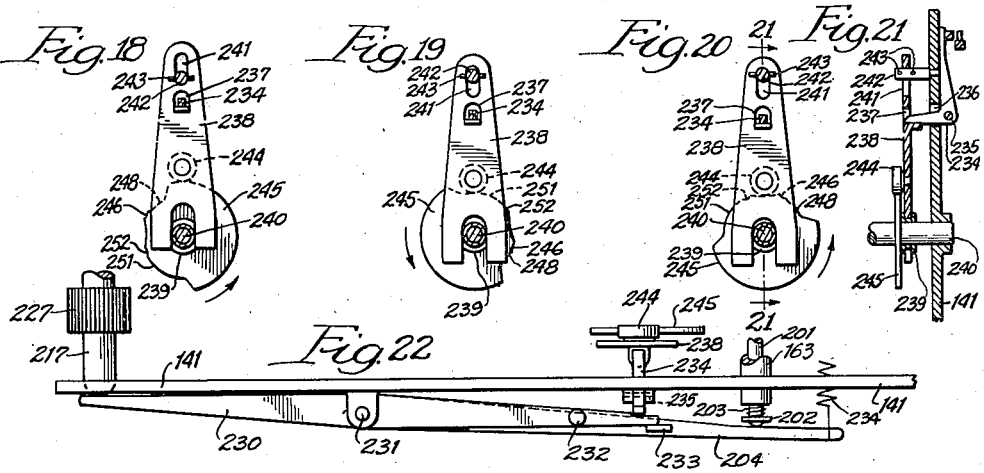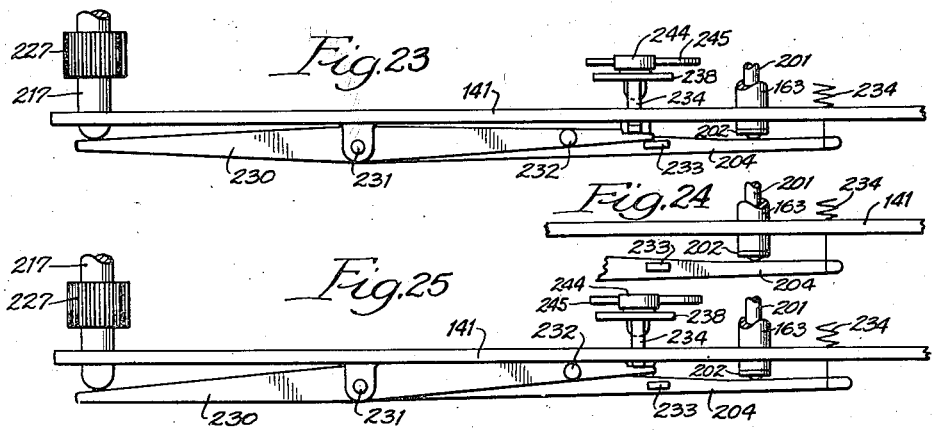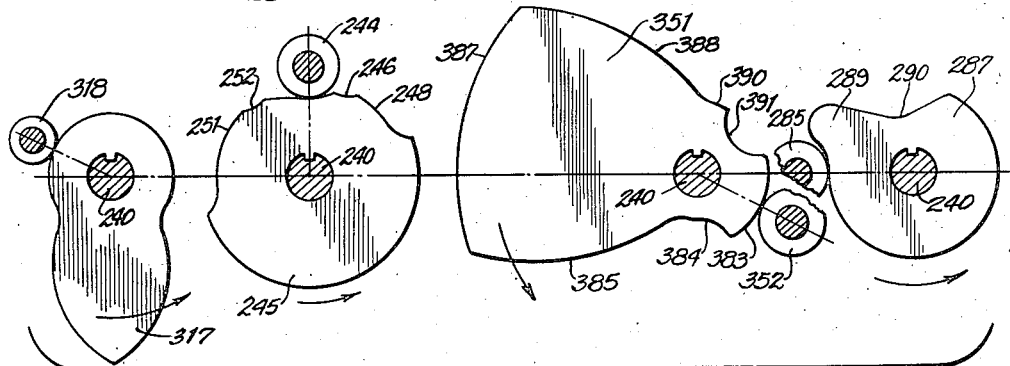

May 5, 1942.　　　E. F. ANDREWS　　　2,281,547
AUTOMATIC PHONOGRAPH
Filed Dec. 20, 1937　　　13 Sheets-Sheet 9
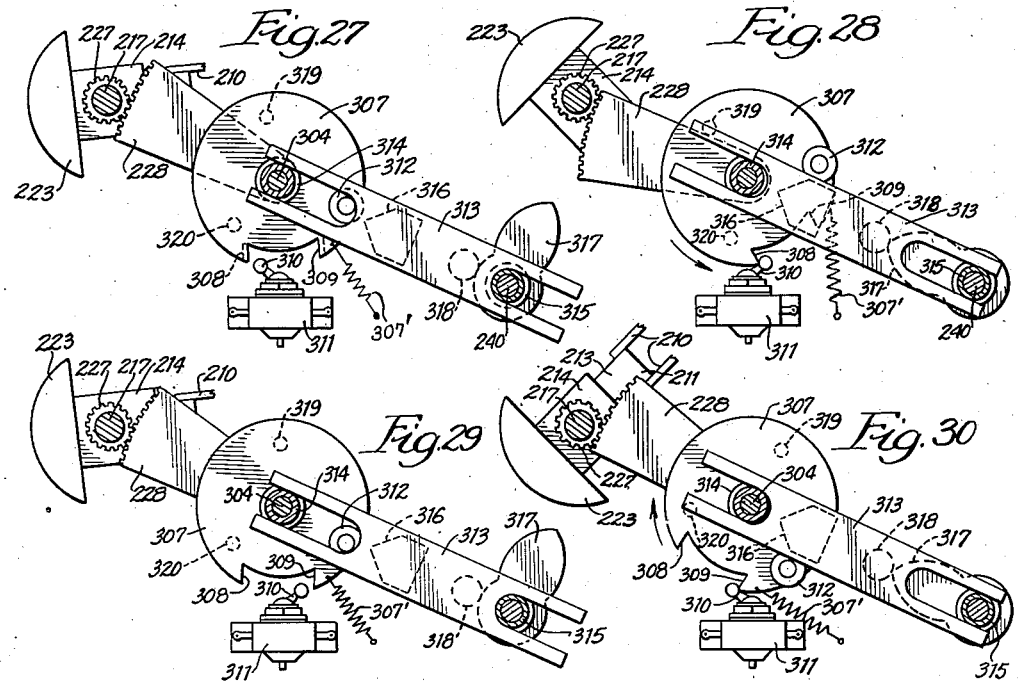
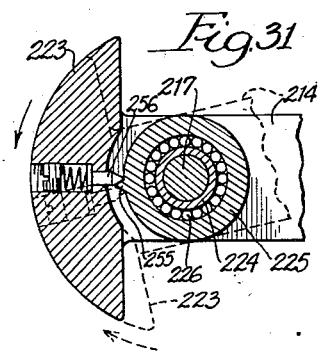
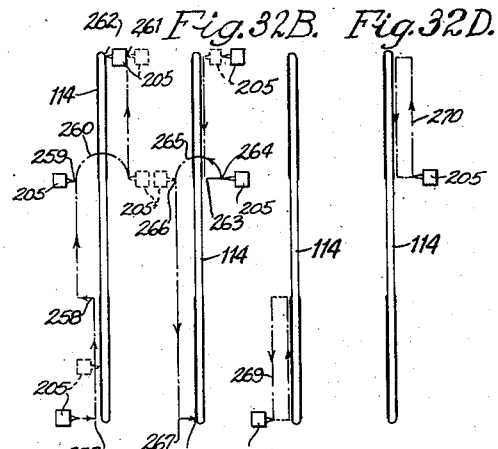
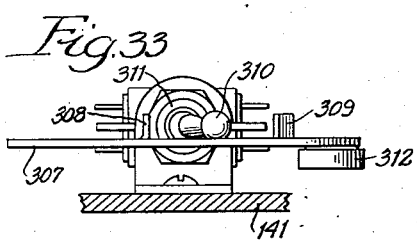
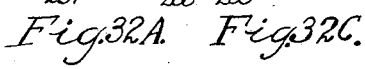
Inventor:
Edward F. Andrews,
By John F. Eakins
Attorney.

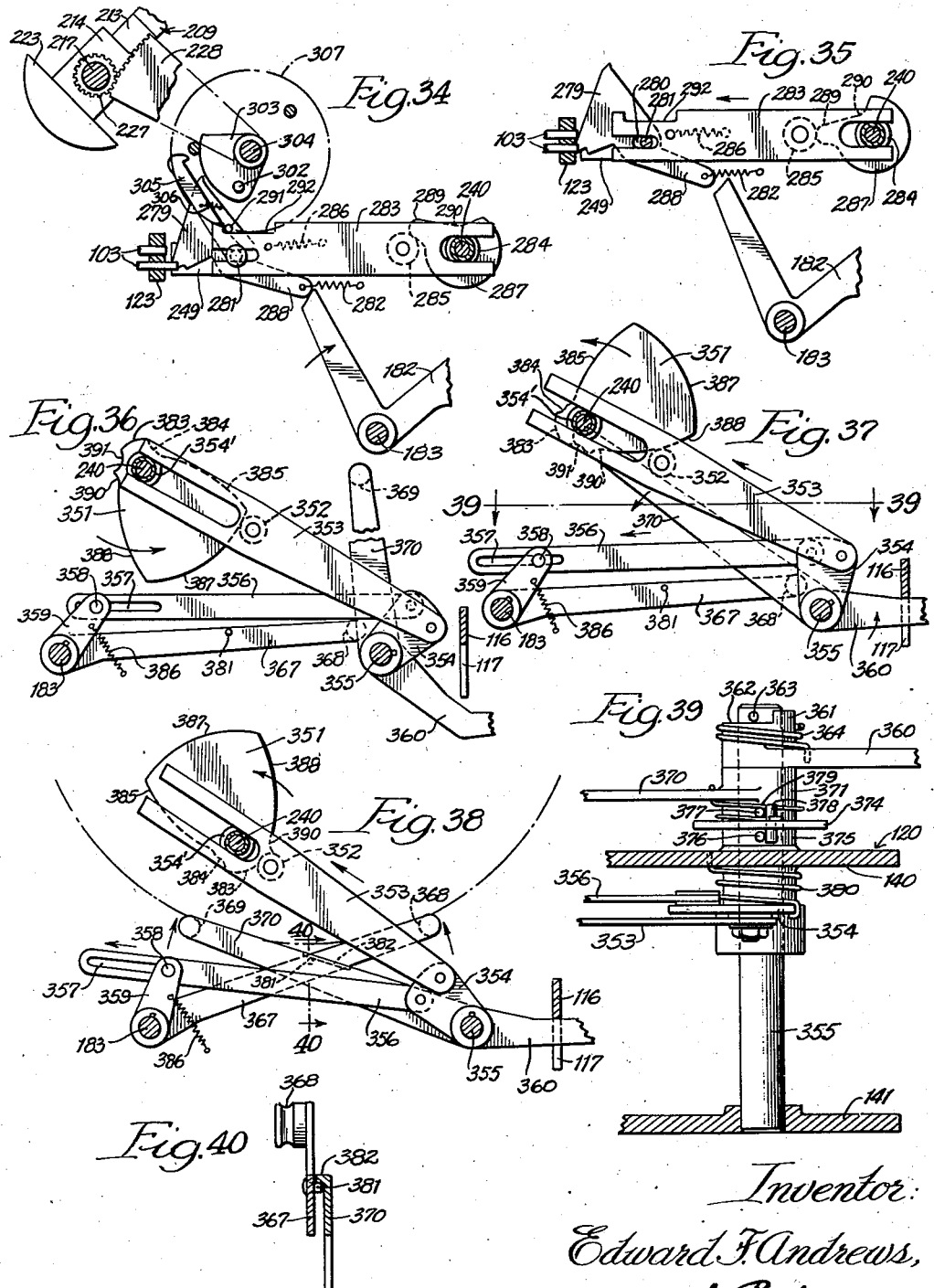

May 5, 1942.  E. F. ANDREWS  2,281,547
AUTOMATIC PHONOGRAPH
Filed Dec. 20, 1937  13 Sheets-Sheet 11

Inventor:
Edward F. Andrews,
By John F. Eakin
Attorney.

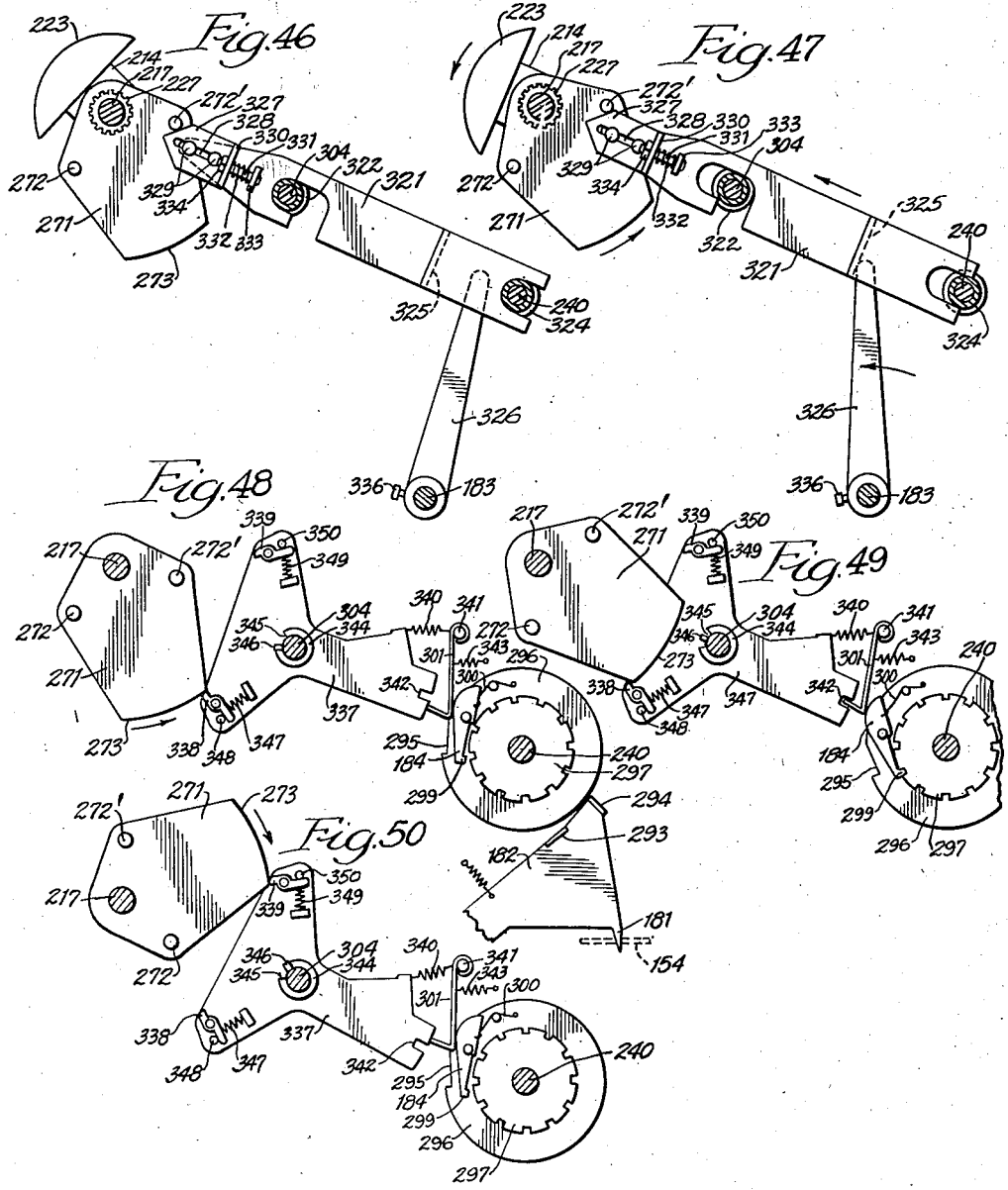

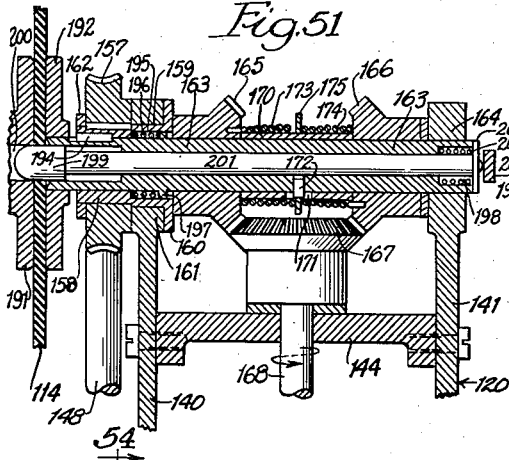
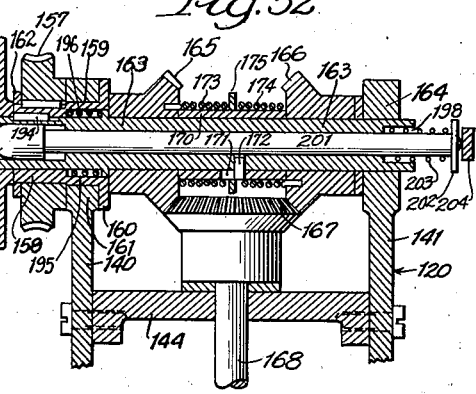
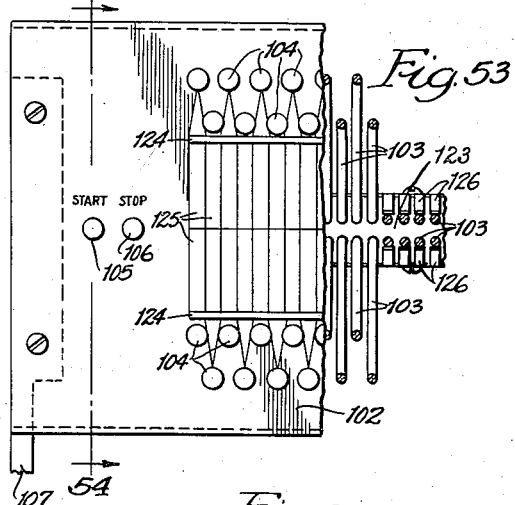
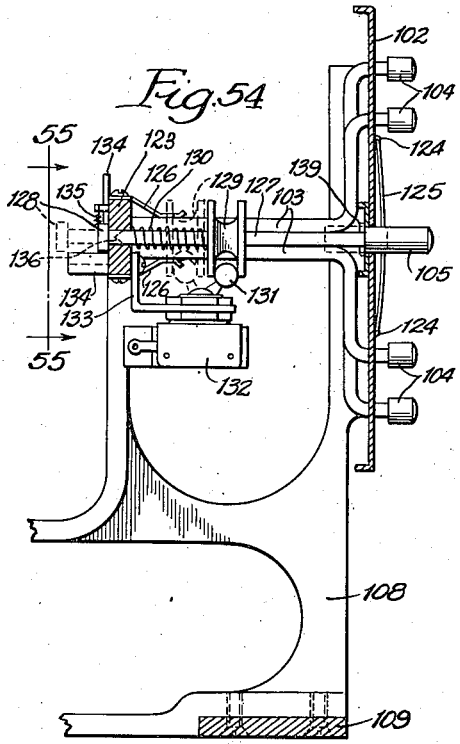
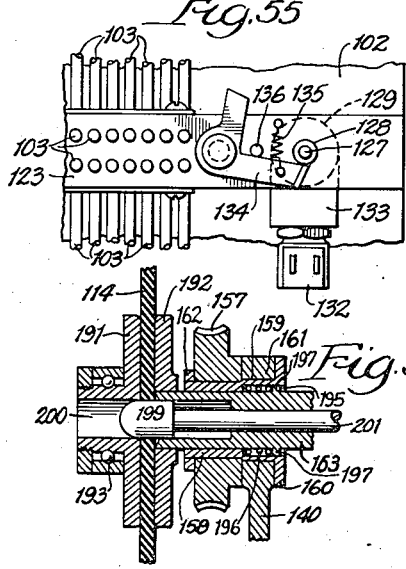

Patented May 5, 1942

2,281,547

UNITED STATES PATENT OFFICE 2,281,547

AUTOMATIC PHONOGRAPH

Edward F. Andrews, Chicago, Ill.

Application December 20, 1937, Serial No. 180,752

59 Claims. (Cl. 274—10)

REISSUED
OCT 3 1944

This invention relates to automatic phonographs, and particularly to automatic phonographs which are adapted to play any desired one of a plurality of records, or any desired plurality of records in the desired or approximately the desired sequence.

The present invention enables the records to be stored in a magazine in compact relation so that the phonograph may be used for the storage of a large library of records, any and all of which are immediately available for automatic playing without being touched by the hand. My improved phonograph comprises a traveling carriage which is equipped with mechanism for removing any selected record from the magazine, playing either or both sides of the record, and returning it to its position in the magazine. The number of records for which the machine is adapted is a matter of choice, since all the operating mechanism is on the carriage, and all that is necessary for the production of a machine which will play a much greater number of records is the provision of a longer magazine, correspondingly longer ways or supports for the traveling carriage, and the provision of the appropriate selector means for the additional records.

As will hereinafter appear, the selector means are simple rod stops, and the magazine merely comprises two bars and spacers supporting the records in close propinquity.

My improved phonograph is adapted for the reception of records by merely placing them in the magazine, and is adapted for the playing of records of either of the conventional sizes.

While this invention comprises many inventive combinations, sub-combinations, and features, which are hereinafter defined in the appended claims, for convenience in understanding the invention, the general nature of the operation of the device will be first described in broad terms.

According to this invention, I provide a magazine for supporting the records. The magazine may be adapted for any number of records desired, and since they occupy a relatively small space in the magazine, the number of records which the machine will receive and deliver for playing is practically unlimited. I provide a carriage which is adapted automatically to travel along the magazine. Selector means, individual to each record, are provided for the arrestment of the carriage in position to cooperate with any of the records in the magazine. The traveling carriage is provided with means for transferring a record from the magazine to record-rotating means on the carriage and for returning the record when played back to the magazine. The carriage is provided with pick-up means for the playing of the record. The pick-up means is rotatable so that either side of the record may be played or both sides may be played, as desired, the selector means being adapted to enable the player to select any record and to control the playing of either or both sides thereof, as desired. The traveling carriage is provided with power means for its bodily travel, for the record transfer, for the record-rotating means, and for other functions necessary for the playing of either side of the record in the manner selected.

In the normal operation of the machine, the selector means are first actuated to select the playing of either or both sides of any number of records in the magazine. The power means is then put into operation, and the carriage starts from its intial position and moves bodily until it is arrested by the first actuated selector means. There are two selector means for each record, corresponding one to each side. Which of the selector means is actuated determines the position and the direction of the pick-up and the needle so as to play the appropriate side of the record. The record transfer means cooperates with the record in the magazine in alignment therewith, to remove the record from the magazine, which removal need not be complete, bringing it into cooperative relation with the record-rotating means. The record-rotating means now engages the record and rotates it in the appropriate direction for playing the side selected. Both directions of rotation are preferably provided by the employment of reversible power means, which may suitably take the form of a reversible motor mounted on the carriage. The pick-up is connected to suitable amplifying and reproducing means so that the reproduction of the record is audible. After the playing of the record, the transfer mechanism returns the record to the magazine. If only one selector means of the record is actuated to play one side of the record, then that selector means is returned to its initial position and after that side is played, the carriage then moves to the next actuated selector, where the operation is repeated. In the event that it is desired to play both sides of the record, one side is played first, the record is returned to the magazine, and the corresponding selector means is discharged. The pick-up arm is turned around to enable the needle to cooperate with the other side of the record at the opposite edge, and when that side is played, the other selector means is discharged, and the carriage moves on to the next actuated selector means. This sequence is continued indefinitely until all the records corresponding to the actuated selector means have been played and the carriage is moved all along the magazine. The carriage is then driven in the opposite direction back to its initial position, and the power is automatically cut off.

The invention will be more completely understood from the following description of a preferred embodiment taken in conjunction with the accompanying drawings, in which:

Fig. 1 is a sectional view through a phonograph cabinet showing in plan view a phonograph embodying my invention. The view also includes a diagrammatic showing of an amplifier and loudspeaker. The phonograph shown in this view is adapted to play 100 records but it may be made to accommodate 50 records by reducing the length to the extent shown by the partition illustrated by dot and dash lines.

Fig. 2 is a front elevational view of the carriage as viewed on the line 2—2 of Fig. 1, the bar 123 used to support record selector rods being broken away and the driving motor being omitted better to illustrate other details. In this view the tone arm is shown in playing engagement with a record.

Fig. 3 is an enlarged plan view of the carriage shown in Fig. 1, with a record in playing position and the tone arm in playing engagement with a record.

Fig. 4 is an end view of the carriage, as viewed from the left of Fig. 1 or more properly a side elevation looking upwardly at the carriage as shown in Fig. 3.

Fig. 5 is a sectional elevation of the carriage and record magazine, the section being taken on the line 5—5 of Fig. 2.

Fig. 6 is a fragmentary sectional plan, the section being taken on the line 6—6 of Fig. 5 and illustrating details of the carriage drive.

Fig. 7 is a sectional elevation of the carriage taken on the irregular line 7—7 of Fig. 2, the upper part of the carriage and some elements carried by it being omitted better to illustrate structural details of the carriage stopping means, the carriage drive clutch, and the cam shaft drive.

Fig. 8 is a fragmentary sectional detail plan view, taken on the line 8—8 of Fig. 7 and illustrating details of the carriage drive clutch.

Fig. 9 is a fragmentary sectional detail plan, taken on the line 9—9 of Fig. 7 and illustrating the carriage stopping arrangement just prior to the carriage reaching an actuated record selector rod.

Fig. 10 is a similar view, showing the elements after the carriage has been stopped by an actuated record selector rod.

Fig. 11 is a sectional plan view of the tone arm in playing engagement with the left hand side of a record, and associated tone arm operating elements.

Fig. 12 is a similar view, showing the tone arm elevated away from the record.

Fig. 13 is a view similar to Fig. 12, with the tone arm rotated to play the right hand side of a record and out of playing engagement with a record.

Fig. 14 is a view similar to Fig. 11, showing the tone arm in playing engagement with the right hand side of a record.

Fig. 15 is a fragmentary elevational view of the upper portion of the carriage, the view being taken on the line 15—15 of Fig. 2, and illustrating further details of the tone arm operating mechanism and of the record clamping means operating mechanism.

Fig. 16 is a fragmentary sectional elevation through the cam shaft, taken on the line 16—16 of Fig. 5.

Fig. 17 is a fragmentary sectional elevation through an auxiliary supporting and guiding shaft for various operating mechanisms, taken on the line 17—17 of Fig. 5.

Figure 1:
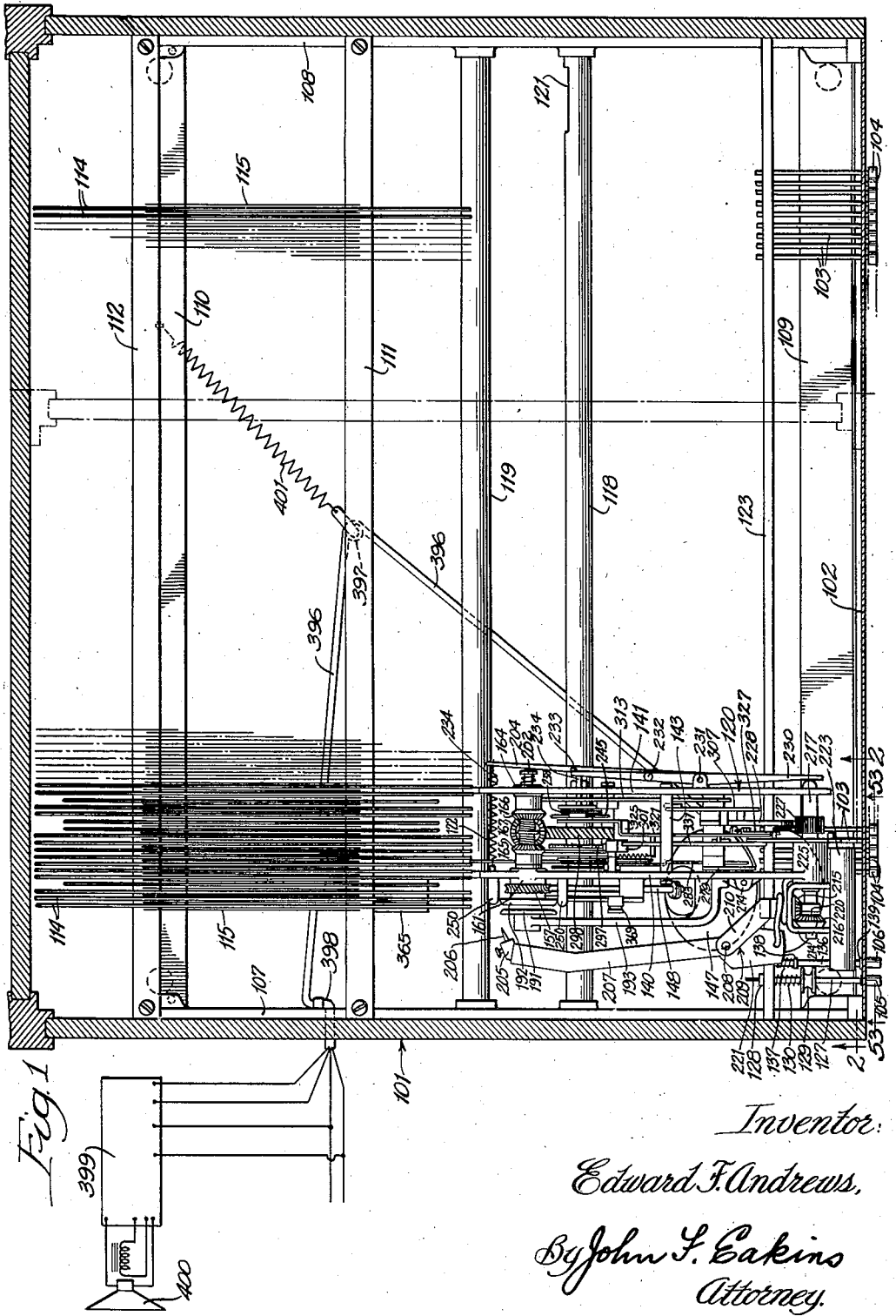

Fig. 18 is a fragmentary sectional view, taken on the line 18—18 of Fig. 2. The view is also taken along the line 18—18 of Fig. 16. This section line illustrates more clearly the exact location of the section line. The view illustrates the details of the record clamping means operating mechanism and of the tone arm operating mechanism.

Figs. 19 and 20 are similar views showing the elements in different positions.

Fig. 21 is a fragmentary sectional elevation, taken on the line 21—21 of Fig. 20.

Fig. 22 is a fragmentary plan view showing the levers and associated elements for controlling the record engaging elements and the movement of the tone arm towards and away from the record. The view is a plan view of a portion of the mechanism shown in Fig. 15.

Figs. 23, 24 and 25 are similar views showing the levers and elements in different relative positions.

Fig. 26 is an exploded view of the control cams showing their relative angular positions on the cam shaft.

Fig. 27 is a sectional detail view, taken on the line 27—27 of Fig. 2, showing the mechanism for controlling the direction of rotation of the motor and for moving the tone arm into initial playing position.

Figs. 28, 29 and 30 are similar views, showing the elements in different positions.

Fig. 31 is a fragmentary sectional detail view, taken on the line 31—31 of Fig. 2, of elements for effecting rotation of the tone arm.

Fig. 32A is a diagrammatic view showing the tone arm movement during the playing of the left side of a record and subsequent movement thereof conditioning it to play the right side of a record.

Fig. 32B is a similar view showing the tone arm movement during the playing of the right side of a record and subsequent movement conditioning it to play the left side of a record.

Fig. 32C is a similar view showing the tone arm movement during the playing of the left side of a record and subsequent movement conditioning it to play the same side of another record.

Fig. 32D is a similar view showing the tone arm movement during the playing of the right side of a record and subsequent movement conditioning it to play the same side of another record.

Fig. 33 is a fragmentary plan view of the motor reversing switch and the switch operating disc.

Fig. 34 is a sectional detail view, taken on the line 34—34 of Fig. 2, showing the mechanism for controlling the reversing switch operating disc and associated elements.

Fig. 35 is a similar view showing certain of the elements shown in Fig. 34 in a different position.

Fig. 36 is a sectional view, taken on the line 36—36 of Fig. 2, showing the record transfer mechanism in one position. The supporting plate 140 and other elements have been omitted better to illustrate the construction and operation of the transfer mechanism.

Figs. 37 and 38 are similar views showing the mechanism in different positions.

Fig. 39 is a fragmentary sectional plan view, taken on the line 39—39 of Fig. 37, showing the main shaft and associated elements of the record transfer mechanism. This view shows the supporting plate 140 and also the other supporting plate 141.

Fig. 40 is a sectional detail view, taken on the line 40—40 of Fig. 38.

Figs. 41, 42, 43, 44 and 45 are diagrammatic views illustrating the operation of the record transfer elements.

Fig. 46 is a sectional detail view, taken on the line 46—46 of Fig. 2, showing the mechanism for locating the tone arm at initial playing position, the mechanism being shown to locate the tone arm at initial playing position for a large record.

Fig. 47 is a similar view, showing the mechanism in a position to locate the tone arm at initial playing position for a smaller record.

Fig. 48 is a sectional detail view, taken on the line 48—48 of Fig. 2, showing the trip mechanism.

Figs. 49 and 50 are similar views showing the trip mechanism in different positions.

Fig. 51 is a sectional detail view, taken on the line 51—51 of Fig. 5, showing the record engaging and rotating means.

Fig. 52 is a similar view showing said means in a different position.

Fig. 53 is a detail view partly in section showing the record selecting and control mechanism, as viewed from the front on the line 53—53 of Fig. 1.

Fig. 54 is a sectional detail view, taken on the line 54—54 of Fig. 53.

Fig. 55 is a fragmentary view of the selector mechanism, taken on the line 55—55 of Fig. 54.

Fig. 56 is a fragmentary detail showing a record engaged by the record rotating means, and Fig. 57 is a wiring diagram.

Referring to the drawings, 101 designates a cabinet in which the automatic phonograph is enclosed. The front wall of the cabinet includes a plate 102 of metal, which is provided with openings for record selector rods 103. These selector rods carry at their outer ends buttons 104, whereby the rods may be pushed inwardly for selection of records to be played. A starting button 105 and a stop button 106 also projects forwardly through the plate 102, as best shown in Figs. 1 and 53.

Two end frames 107 and 108 are mounted on the end walls of the cabinet (see Fig. 1). These end frames are connected together by front and rear longitudinal frame members 109 and 110. Two record supporting bars 111 and 112 extend between the frames 107 and 108. As best seen in Fig. 5, these bars are of rectangular section, but have their upper faces 113 cut to conform to the periphery of the records 114, which are supported vertically thereon. The upper and outer portions of the faces 113 are suitably formed with a curvature corresponding to a 12" record, while the lower or inner portions of the faces 113 are suitably conformed to the curvature of a 10" record. A series of wire or plate guides 115 are mounted on the bars 111 and 112 so as to extend upwardly therefrom, as shown in Fig. 5. The guides 115 may suitably be in the form of an inverted U member, and they are displaced somewhat towards the rear wall of the cabinet so as to reduce the travel necessary for the record to clear the guides when the record moves into playing position. A 12" record is shown in playing position in the left hand side of Fig. 5, and it will be seen in this figure that the record being played is clear of the guides 115 which normally support it in the magazine. The guides 115 are placed close together; for example, they may be on $\frac{3}{16}$ or $\frac{1}{4}$ inch centers on the rods 111 and 112. As best seen in Fig. 1, the guides 115 support the records 114 in vertical position transverse with respect to rods 111 and 112. The cabinet may be provided with a movable cover or upper wall so that records may be placed in position by merely dropping a record between two adjacent guides 115 onto the bars 111 and 112. As will hereinafter be pointed out, the records may be mounted on the record rotating means, and they may be placed in the magazine by the operation of the record returning mechanism. A comb-like member 116 is secured to and depends below the bar 111 and is provided with a series of slots 117, each of which is in alignment with a record receiving space between adjacent guides 115. As will be pointed out hereinafter, the slots 117 serve to locate the movable carriage in alignment with the selected records.

Two longitudinal tubes 118 and 119 extend between the end frame members 107 and 108. These tubes are in parallel spaced relation and serve for the support of the carriage 120. Near the right hand end, the inner or rear face of the tube 118 is cut away as shown at 121, while the inner or forward face of the tube 119 is cut away at its left hand end at 122, as shown in Figs. 1 and 6. The purpose of the recesses 121 and 122 will hereinafter appear.

Referring now more particularly to Figs. 1, 5, and 53 to 55, it may be seen that a longitudinal bar 123 extends between the end frame members 107 and 108 adjacent the front plate 102 and parallel thereto. The bar 123 is provided with openings through which extend the inner ends of the record selector rods 103. Two rods 103 are provided in vertical alignment for each of the record spaces on the magazine. The rods 103 are displaced somewhat to the right with respect to the records or record spaces with which they are operatively associated. As best seen in Fig. 5, the upper rods 103 are bent upwardly and the lower rods 103 are bent downwardly so that the upper buttons 104 are substantially spaced from the lower buttons 104, notwithstanding that the near ends of the rods 103 are located quite close together. The upper series of buttons 104 and the lower series of buttons 104 are alternately staggered in a vertical direction so as to enable any button to be pressed inwardly without disturbing the buttons adjacent thereto. Between the upper and lower series of buttons 104, I provide two opposed lips or beads 124 which are adapted to receive between them flexible tabs 125. These tabs may be used for the titles of the selections on the opposite sides of a record, or they may be used for key numbers whereby selections may be identified with reference to an index. It may here be explained with reference to Fig. 53 that each vertically aligned pair of buttons 104 is associated with one individual record and that the upper button is associated with the selection on the left hand side of the record (referring to Fig. 1), and that lower button 104 is associated with the selection on the right hand side. Friction means are provided so as to keep the rods 103 in any position in which they are placed. Such friction means may suitably comprise springs 126 mounted on the upper and lower edges of the bar 123 so as to bear against the rods 103.

The start button 105 is mounted on the end of a rod 127 which extends through an opening in the bar 123. At its rear end, beyond the bar 123, the rod 127 has rigidly mounted thereon a collar 128 which limits its movement in the forward direction. Between the bar 123 and the front plate 102 the rod 127 rigidly carries a grooved collar 129. A coiled spring 130 located around the rod 127 bears against the bar 123 and against the collar 129 so as to tend to maintain the rod 127 in its outer or forward position. The groove of the collar 129 receives the end of an arm 131 of a switch 132 which is rigidly mounted on the bar 123 by means of a bracket 133. When the rod 127 is in its forward position, that is, the full line position as shown in Fig. 54, the switch 132 is off. When, however, the button 105 is pushed inwardly, the collar 129 moving inwardly with the rod 127 throws the switch 132 on, the on position being shown in dotted lines in Fig. 54.

On the rear side of the bar 123 is pivotally mounted a two armed dog 134. This dog is biased upwardly by means of a spring 135 so that one of its arms bears against the collar 128 when the button 105 is in its outermost or stop position. When the button 105 is moved inwardly to close the switch 132 and start the machine, the spring 135 moves the dog 134 so as to bring its lower arm up in front of the collar 128, and consequently the switch 132 is held closed until the dog 134 is again moved clear of the collar 128. When such movement occurs, the spring 130 throws the rod 127 outwardly again and opens the switch 132. The other arm of the dog 134 projects upwardly beyond the bar 123 so that it may be engaged by the carriage 120 when it returns to its initial position. The dog 134 may also be displaced against the tension of the spring 135 by means of the stop button 106 carried by a rod 136. The inner end of the rod 136 is normally located within an opening in the bar 123 and is of tapering form, as best seen in dotted lines in Fig. 54. When the button 106 is pressed inwardly, the tapered end of the rod 136 is projected rearwardly out of the bar 123 and its tapered end cams the dog 134 downwardly against the tension of the spring 135 so as to release the rod 127 and effect the opening of the switch 132. The rod 136 is biased forwardly by a spring 137 (see Fig. 1) which bears against the bar 123 and against a collar 138, rigidly mounted on the rod 136 so as to bias the button 106 outwardly. A collar 139 rigidly carried by the rod 136 immediately behind the plate 102 serves as a stop to limit the outward movement of the rod 136.

The carriage 120 comprises two parallel frame plates 140 and 141 which are secured together in parallel spaced relation by means of shouldered bolts 143. The plates 140 and 141 are also rigidly connected by means of horizontal, vertically spaced apart, bridge members 144, 145, and 146 shown in section in Fig. 7. The plates 140 and 141 are each provided on their under side with openings 155 (Figs. 4 and 5), the upper portions of which openings receive the tubes 118 and 119 upon which the carriage 120 rides. The plates 140 and 141 carry rollers 156 (Figs. 5 and 6) which bear against the front side of the supporting tube 118 and against the rear side of the supporting tube 119 so that the carriage 120 may move freely on the guide tubes 118 and 119 and at the same time be held against rotative displacement transversely with respect to these tube supports.

A motor 147 is resiliently mounted on a bracket 149 carried by the frame plate 140, as shown in Fig. 5. The shaft 148 of the motor, which includes a pair of universal joint connections 150 and 151, extends upwardly obliquely, and its upper end is supported by bearings 152 between which the shaft 148 carries a worm 153. The worm 153 cooperates with a worm gear 157 which is rigidly mounted on a sleeve 158 which is rotatably mounted in a bearing 159 in the upper part of the frame plate 140, as best seen in Figs. 51 and 52. One end of sleeve 158 has a flange 160 which bears against the inner side of a boss 161, in which the bearing 159 is located. The worm gear 157 is secured against displacement by means of a nut 162, which is secured to the end of the sleeve 158 opposite the flange 160. A tubular shaft 163 extends through the sleeve 158 so as to slide therein in its longitudinal direction. The sleeve 158 is keyed to the tubular shaft 163 so that both elements rotate together when the motor is in operation. The tubular shaft 163 is supported at its opposite end in a bearing in a boss 164 in the upper portion of the plate 141. Between the sleeve 158 and the boss 164, two opposed bevel gears 165 and 166 are mounted on the hollow shaft 163. These gears mesh with a bevel gear 167, which is connected to a shaft 168 which extends downwardly between the plates 140 and 141, as best seen in Fig. 7. The upper end of the shaft 168 has a bearing in the bridge member 144, and below this bridge member it carries a gear 169, the purpose of which will hereinafter be more fully described.

Between the bevel gears 165 and 166 is mounted a sleeve 170. This sleeve is provided with a slot 171 in which is received a pin 172 carried by the hollow shaft 163, so that the hollow shaft 163 may move longitudinally within the sleeve 170, which sleeve, however, will rotate with the hollow shaft 163. Two coil springs, both of which are left-handed, 173 and 174, are located around the sleeve 170. The remote ends of the springs 173 and 174 are secured to the bevel gears 165 and 166 respectively. A washer 175 is mounted on the sleeve 170 so as to separate the two springs 173 and 174. The springs 173 and 174 have a normal diameter which is slightly smaller than the exterior of the sleeve 170, so that they tend to contract upon this sleeve. When the hollow shaft 163 is driven in a counterclockwise direction, as viewed from the left hand side of Fig. 51, the spring 173 tends to tighten on the sleeve 170 so that the bevel gear 165 is caused to rotate in the same direction as the hollow shaft 163, that is, the counterclockwise direction, as viewed from the left in Fig. 51. This rotation of the shaft 163 tends to loosen the spring 174; consequently, the gear 165 is driven while the gear 166 tends to idle. In idling, it is driven in the opposite direction, that is, the clockwise direction, as viewed from the left in Fig. 51, owing to the connection of both these gears with the bevel gear 167. This clockwise rotation of the gear 166 tends further to loosen the spring 174. The bevel gear 167 and the shaft 168 are driven in the counterclockwise direction, as viewed in plan.

When, however, the direction of the motor is reversed and the gear wheel 157 is rotated in clockwise direction, as viewed from the left in Fig. 51, the spring 174 is tightened on the sleeve 170 and the spring 173 is loosened. Under these circumstances, the gear 166 is driven in the clockwise direction, as viewed from the left in Fig. 51, and the gear 165 idles in the opposite direction. In this case, again, the gear 167 and the shaft 168 are driven in counterclockwise direction, as viewed in plan. Consequently, irrespective of the direction of the motor, it always operates to drive the shaft 168 in the same direction.

Referring now more particularly to Figs. 5, 6, and 7, it may be seen that the lower end of the shaft 168 is rigidly secured to a sleeve 176 which projects beyond the lower end of the shaft. The projecting portion of the sleeve 176 freely receives the upper end of a shaft 177, which has bearings in the bridge members 145 and 146, as best seen in Fig. 7. The shaft 177 rigidly carries a collar 178, which abuts against the lower end of the sleeve 176. Freely mounted on the exterior of the sleeve 176 is a sleeve 179. The lower portion of the sleeve 179 is flared to provide a housing between it and the sleeve 176 for the reception of a coil spring 180, which is adapted to grasp the sleeve 176. The upper end of the coil spring 180 is secured to the sleeve 179, and its lower end is secured to the collar 178. The spring 180 is a right hand spring, and it will readily be seen that the rotation of the shaft 168 in the counterclockwise direction, as viewed in plan, will accentuate the grip of the spring upon the sleeve 176 and consequently effect the driving of the shaft 177 in the same direction. The clutch provided by the spring 180 is adapted to be released by a detent 181 on a bell crank lever 182, which is pivotally mounted on a shaft 183. When this bell crank lever is swung in a clockwise direction, as viewed in Fig. 7, the detent 181 moves into the path of one of the teeth 154 (Fig. 8) on the lower flange of the sleeve 179. The arrestment of the sleeve 179 loosens the spring on the shaft 177 and terminates the drive of the shaft for the time being. It may here be noted that this clockwise movement of the bell crank lever 182 also releases a dog 184, with the result that a plurality of cams, hereinafter described, are set in operation.

Two arms 185 are freely mounted upon the shaft 177 above the bridge member 146, as shown in Fig. 7. These arms are separated by a sleeve 186. A wheel 187 of rubber or other suitable resilient material is mounted between the two arms 185 by means of a shaft 188 (see Fig. 6), to which the wheel 187 is rigidly secured. This shaft 188 is rigidly secured, above the upper arm 185, to a gear 189 which meshes with a pinion 190, rigidly mounted on the shaft 177. It may be noted that the shaft 177 is located halfway between the tubular supports 118 and 119, and that the wheel 187 is arranged so that it may operatively engage either of these tubular supports. As best seen in Fig. 6, the sum of the pitch radius of the pinion 190, the pitch radius of the gear 189, and the effective radius of the wheel 187, is somewhat less than the distance between the axis of the shaft 187 and either of the bars 118 and 119. The result is that the counterclockwise rotation of the shaft 177 tends to carry the arms 185 and the wheel 187 bodily around with it until the wheel 187 is wedged forcibly against one of the bars 118 or 119. When the wheel 187 can be carried no further in the clockwise direction around the shaft 177, it is rotated by its own shaft 188 so that the carriage 120 is translated along the ways or tubular guides 118 and 119. In Fig. 6, the carriage is shown moving to the left, owing to the counterclockwise rotation of the shaft 177. When the carriage approaches the left hand end frame 107, the wheel 187 enters the recess 122 and no longer operatively engages the bar 119. Consequently, the wheel 187 rotates in the counterclockwise direction around the shaft 177 until it engages the bar 118. If the drive of the shaft 177 was maintained indefinitely and the carriage was not stopped in any way, the carriage would then be driven towards the right hand frame member 108, and when the wheel 187 entered the recess 121 in the bar 118, it would be free to swing around into an engagement with the bar 119, and the carriage would oscillate backward and forward indefinitely. As will hereinafter be more fully described, the carriage is normally arrested by one or more of the rods 103, and when the carriage returns towards its initial or left hand position, it engages the upper end of the dog 134 and opens the switch 132, which cuts off the power to the motor. When, however, the start button 105 is again pressed, the motor starts operating and the translation of the carriage 120 towards the right is again initiated.

When the record is being played, it is engaged near its center on opposite sides by two small turntables or record clamping members 191 and 192, as shown in Figs. 3 and 4. The turntable 191 is supported by means of an anti-friction bearing on the upper end of a bracket 193. The bracket is secured to the outer or left hand side of the frame plate 140. The bracket 193 extends for a considerable distance in parallel spaced relation to the plate 140 so that the largest records used may be accommodated between the bracket 193 and the frame plate 140, when the record is in playing position. The bracket 193 preferably extends downwardly and forwardly so that the path of the record between the magazine and playing position is not impeded by the bracket. The small turntable 192 is rigidly mounted on the left hand end of the previously described hollow shaft 163, to the left hand side of the gear 157. This hollow shaft is capable of longitudinal movement between the positions shown in Figs. 51 and 52, but it rotates with the gear 157, being keyed thereto as shown at 194. The sleeve 158 is provided with a recess 195, which receives a spring 196. The left hand end of the spring 196 bears against a shoulder on the sleeve 158, and the other end bears against a shoulder 197 on the hollow shaft 163. The spring 195 thus tends to move the small turntable 192 into the position shown in Fig. 52. The right end of the hollow shaft 163 is provided with an axial recess 198. A record centering pin 199 is adapted to move in the left hand end of the hollow shaft 163 carrying turntable 192 and is adapted to project into an opening 200 in the center of the small turntable 191. The centering pin is carried on one end of a rod 201, which extends through the bore of the hollow shaft 163. At its right hand end, the rod 201 carries a small disc 202, which is adapted to engage the right hand end of the hollow shaft 163. A spring 203, located in the recess 198, normally tends to move the rod 201 to the right relative to the hollow shaft 163. The rod 201 and the hollow shaft 163 are adapted to be moved to the left by means of a lever 204, which will hereinafter be more fully described. When the lever 204 moves to the right from the position shown in Fig. 51 into the position shown in Fig. 52, the spring 196, which is stronger than the spring 203, first moves the hollow shaft 163 to the right with the pin 199 projecting out of the hollow shaft 163, the centering pin 199 and the pin 201 being first translated to the right while substantially maintaining the relation shown in Fig. 51.

When the shoulder 197 on shaft 163 is arrested at the end of its travel towards the right, the spring 203 becomes effective, so that the centering pin 199 is completely withdrawn into the hollow shaft 163, as shown in Fig. 52. When the lever 204 is pressed to the left, as viewed in Figs. 51 and 52, the pin 201 is first displaced toward the left, owing to the fact that the spring 196 is much stronger than the spring 203. That is, the first effect of the movement of the lever 204 to the left is the projection of the pin 199 outwardly to the left, beyond the small turntable 192. As will hereinafter be explained, this projection occurs when a record is located between the turntables 191 and 192 with its center opening out of alignment with the pin 199. The record is then moved into alignment and the pin 199 springs into its center opening. Continued movement of the lever 204 to the left, owing to the engagement of the disc 202 with the right hand end of the sleeve 163, causes the sleeve and the rod 201 to move together to the left so that the centering pin 199 extends into the opening 200 in the turntable 191, and the record 114 which is located between the two turntables 191 and 192, becomes clamped therebetween and is immediately set into rotation by the motor 147. The direction of rotation of the record depends upon the direction of rotation of the motor.

The tone or player arm will now be described in conjunction with Figs. 1 to 4 and 11 to 14 and more particularly the latter. This tone arm carries a pickup 205 and a needle 206. The pickup 205 is carried at the end of an arm member 207, which is pivotally mounted by means of a rod 208 upon a frame 209, which comprises parallel arms 210 and a collar 211 between them, the axis of which is at right angles to the rod 208. The collar 211 is rigidly secured to a sleeve 212, which is rotatably mounted in a bushing 213, carried by a U shaped frame or yoke 214. At its inner end, and within the U shaped frame member 214, the sleeve 212 carries a bevel gear 215. The bevel gear 215 meshes with a bevel gear 216, which is mounted within the frame member 214 adjacent one side thereof, as may be seen in Fig. 11. The gear 216 is keyed to a shaft 217 so as to rotate therewith while permitting relative longitudinal movement between the shaft 217 and the gear 216. The arm 207 comprises a rearward extension 218, the end of which engages a pin 219 located within the sleeve 212. The opposite end of the pin 219 engages the shaft 217. This shaft is provided with a frustro conical cam surface 220. When the shaft 217 is moved to the left, as viewed in Figure 1, or upwardly, as viewed in Figs. 11 to 14, the cam surface 220 pushes the pin 219 outwardly so that the tone arm is swung around its pivot rod 208. When the tone arm is located on the left hand side of the record, as shown in Fig. 11, this movement of the rod 217 moves the tone arm away from the record 114 to the left, as viewed in Fig. 1, or upwardly, as viewed in Figs. 11 and 12. When the tone arm is in the position shown in Fig. 14, that is, when it is playing the right hand side of a record, as viewed in Fig. 1, then the movement of the shaft 217 referred to causes the tone arm to move to the right away from the record 114 into the position shown in Fig. 13. The tone arm 207 is provided with a counterweight 221 so that it is practically independent of gravity in all its positions. The tone arm is biased by a small spring 222, which is preferably located adjacent the rod 208, towards the record with the same pressure at all times. This spring causes the pickup to come into contact with the record immediately the shaft 217 moves to the right, as viewed in Fig. 1. The frame or yoke 214 carries on the side opposite the tone arm 207 a counterweight 223, so that the tone arm assembly is practically unaffected by gravity when playing either side of a record located in a vertical plane. The yoke 214 is pivotally mounted by means of an integral sleeve 224, which is mounted for free rotation on a horizontal axis within a boss 225, which is carried by the frame plate 140. Free movement of the tone arm is insured by means of ball bearings 226 between the sleeve 224 and the boss 225. The shaft 217 extends through the sleeve 224 and through an opening in the frame plate 141. Between the sleeve 224 and the frame plate 141, the shaft 217 carries a pinion 227, which meshes with a sector gear 228. A coil spring 229 is located around the shaft 217 so as to abut against the pinion 227 and against the right hand end of the sleeve 224. Consequently, the shaft 217 tends to maintain its extreme right hand position as shown in Fig. 1, which corresponds to the lowermost positions as shown in Figs. 11 and 14. The shaft 217 is adapted to be displaced to the left, as viewed in Fig. 1, by means of a lever 230, which is pivotally mounted at 231 on the outer or right hand side of the frame plate 141. The lever 230 extends rearwardly beyond its pivot 231, and this projecting portion is provided with a button 232 whereby the lever 230 may be swung manually, if desired. At its rearmost end the lever 230 engages the inner or left hand side of a projection 233 (see particularly Figs. 22 to 25), which is mounted on the turntable clamping lever 204, previously referred to. The lever 204 is also pivotally mounted on the outer or right hand side of the frame plate 141, and it is held by a spring 234 against the outer end of the rod 201, and with its projection 233 against the lever 230.

The lever 230 is adapted to be actuated by a bell crank lever 234, which is pivotally mounted on the outer or right hand side of the frame plate 141, the pivot being shown at 235 in Figs. 2, 16, 21, and 22. One arm of the bell crank lever 234 extends upwardly and engages the inner or left hand side of the lever 230 rearwardly of its pivot 231. The other arm of the bell crank lever 234 extends inwardly through an opening 236 in the frame plate 141 and through an opening 237 in a vertical plate 238, which is adapted to slide vertically Figs. 16 and 21. The sliding plate 238 has a lower slotted end which is guided for sliding movement in the vertical direction by engagement with a bobbin 239 secured to a cam shaft 240. The upper end of the sliding plate 238 is provided with a slot 241 which receives a pin 242 rigidly mounted in the frame plate 141. Suitable guides, such as pins 243, maintain the plate 238 in a vertical position. The plate 238 carries a cam roller 244, which engages a cam 245 keyed on the shaft 240.

It may here be stated that the cam shaft 240 is given two parts of a revolution during the cycle of playing a record. When a record is being played, the cam 245 and the cam roller 244 have the positions shown in Fig. 26, which corresponds to a view looking from the right hand of the machine, or the right hand side of Fig. 1. The levers 230 and 204 have the position shown in Fig. 25, which corresponds to the pickup needle being in engagement with the record and the turntables 191 and 192 holding the record being played, clamped between them. It may here be noted also that the turntable clamping lever 204 is forcibly held against the rod 201 by means of the spring 234 secured to the rear end of said lever, which is sufficiently strong to overcome both the springs 196 and 203 associated with the turntable clamping arrangement. When the record has been played, the cam shaft 240 is driven through somewhat less than a half revolution in the counterclockwise direction, as viewed in Fig. 26. During the initial part of this part revolution, the cam roller 244 and the sliding plate 238 are elevated somewhat to a position corresponding to a point 246 on the cam 245. This movement moves the lever 230 into the intermediate position shown in Fig. 23, from which it will be understood that the pickup has been moved away from the record, which record is still held clamped between the turntables. Continued rotation of the cam 245 locates the cam roller 244 upon an arcuate portion 248 of the cam 245, which results in the slight movement of the lever 204 away from the frame plate 141 into the position shown in Fig. 24. This slight outward movement of the hollow shaft 163 and the rod 201 retracts the turntable 192 away from the record 114. The record is prevented from following the turntable 192 by means of two posts 250 (Figs. 1 and 3) carried by the frame plate 140 on either side of the turntable member 192. These posts are slightly to the right of the level of the surface of the turntable 192 when that member is in record engaging position. However, when the turntable 192 is retracted in the manner just described, its surface is located to the right of the end of the two pins 250. The two pins 250 have rounded ends and are highly polished so that the record is not injured by contact therewith. When the turntable 192 is thus retracted, leaving the record supported by the centering pin 199, the record very soon loses its rotation. Continued rotation of the cam 245 locates the cam roller 244 upon the highest part of the cam 245, with the result that the levers 230 and 204 are moved into the position shown in Fig. 22. It will be noted that the centering pin has moved to the right into the hollow shaft 163, as shown in Fig. 52. These operations are completed during a rotation of the cam shaft 240 of somewhat less than 90 degrees, and are performed in the reverse order during the latter portion of the second part of the rotation of the cam shaft 240. This second part of the rotation occurs immediately before a record is played. In the embodiment of the invention shown, this part rotation amounts to about 225°. At the initial part of this part rotation, the cam roller 244 rests upon the highest arc of the cam 245. It remains upon this highest arc while the cam rotates almost 90 degrees. As has been pointed out, the levers 230 and 204 are in the position shown in Fig. 22. At the end of rotation of somewhat less than 90 degrees from the beginning of the second part-revolution, the cam roller 244 moves downwardly and rests upon an arcuate surface 251 of the cam 245 of less radius. The resulting movement of the sliding plate 238 in the downward direction brings the levers 230 and 204 into the position shown in Fig. 24. This movement effects the projection of the centering pin 199 out of the hollow shaft 163 and into the opening 200 in the turntable 191. Continued rotation of the cam 245 brings the roller 244 to a position 252, corresponding to the position of the levers 230 and 204 shown in Fig. 23. This change of position effects the bodily movement of the hollow shaft 163 so as to move the turntable 192 to clamping position. The resulting movement of the tone arm actuating shaft 217 has no effect upon the tone arm because at this time the pin 219 is resting against the cylindrical surface 247, which is located to the right hand side of the frustro conical cam surface 200. During the final portion of the part revolution, the cam roller 244 moves downwardly into its lowermost position, shown in Fig. 26, and the lever 230 moves into the position shown in Fig. 25. This movement corresponds to the lowering of the tone arm onto the record; that is, the movement of the tone arm from the position shown in Fig. 12 to the position shown in Fig. 11, or from the position shown in Fig. 13 to the position shown in Fig. 14, depending upon the location of the tone arm on one side of the record or the other side of the record.

As will hereinafter be described, the tone arm 207, after playing the record, may be returned towards its initial playing position in the opposite manner in which it travelled during the playing. Or it may be moved in the same direction as it moved during playing so that it may be brought into engagement with the record or another record at a point approximately diametrically opposite and on the opposite side of the record from its initial playing position. The actuations of the tone arm are effected by the previously referred to sector gear 228, which meshes with the pinion 227 on shaft 217 and is thrown in one direction or the other in a manner hereinafter to be described. It is to be noted that when the sector is actuated so as to throw the tone arm in a direction which is a continuation of its direction of movement during playing, the spring pressed detent 256 carried by the tone arm supporting bracket 214 comes into contact with the projection 255 on the boss 225 (Fig. 31). While the sector 228 primarily drives the shaft 217, the tone arm 207 moves bodily therewith on account of the friction of the gears 214 and 216. The frictional resistance between the pin 256 and the projection 255 is such that movement of the sector becomes effective in rotating the tone arm 207, or rather its supporting frame 210, about its axis. This rotation of the tone arm continues until the pin 254 on sleeve 212 reaches the opposite end of the slot 253 in bushing 213 (see Figs. 11 to 14). When the resistance of this stop is encountered, the sector, continuing to drive the shaft 217, moves the pin 256 past the projection 255, and the tone arm assembly is carried bodily to the new record playing position. As best seen in Fig. 31, the projection 255 and the spring pressed pin 256 are located so that they become engaged when the tone arm axis is directed rearwardly and somewhat upwardly with respect to the horizontal. The various tone arm movements are shown diagrammatically in Figs. 32A to 32D, inclusive. In Fig. 32A the pickup 205 engages the outer periphery of the record for playing the selection on the left hand side, adjacent its lower edge, as seen at 257. For playing this record, the same is rotated in clockwise direction, as viewed from the left. When played in this manner, the pickup 205 moves inwardly to the end of the sound track, as indicated at 258. Here the cam shaft is put into operation in a manner which will hereinafter be more fully described, and the cam 245 causes the pickup to move away from the record. If the mechanism has been set so as to play the same or another record on the opposite side, the sector 228 moves the pickup to position 259. By this time the record has been removed from playing position, and the pin 256 comes into contact with the projection 255. Consequently, the tone arm is rotated about the axis of its frame, the point of the needle performing an arcuate path 260. After its inversion, the pickup is carried upwardly to the point 261 and is caused to drop into an engagement with the other side of the record or the other side of a new record at the point 262. The tone arm moves during the playing of the right hand side of the record inwardly to a position 263, approximately at the inner end of the sound track, as shown in Fig. 32B. The pick-up then rises from the record into the position shown in position 264 and becomes inverted, if the left side of the record is next being played, the point of the needle following the arc 265. When this inversion is completed, the pick-up moves from position 266 to position 267 and then descends onto the record at 268. In the event that left hand sides of records are to be played continuously, the pickup will continue to move in a rectangular path, as shown at 269 in Fig. 32C. If, however, a plurality of right hand sides of records are to be played, the pickup will perform a substantially rectangular path 270, as shown in Fig. 32D. The location of the projection 255 and the pin 256 is such that the inversion of the tone arm or the rotation of its frame occurs at an elevated position so that the tone arm and the pickup will clear the turntables 191 and 192 and the frame member 140 and associated mechanism.

Referring now to Figs. 3 and 46 to 50, inclusive, it may be noted a plate 271 is mounted on the inner or right hand end of the sleeve 224 so that it moves in unitary relation with the U shaped frame member 214 and the sleeve 213, which serves as the axial pivotal support of the tone arm 207. The plate 271 is provided with two upstanding pins 272 and 272¹, and it is provided with an arcuate edge 273, the center of which is the axis of the shaft 217. The plate 271 performs important functions in the setting of the tone arm to initial playing position and in the tripping of the mechanism at the end of the playing of one side of a record, as will hereinafter be more fully pointed out.

A dog 249 is mounted on the front edge of the frame plate 140 so as to swing on a vertical axis (see Figs. 5, 7, 9, and 10). This dog is relatively wide in the vertical direction as shown in Fig. 7 so that it may engage any of the pins 103 which may be pressed inwardly. The dog 249 is provided with laterally turned portions 249¹ whereby it may be pivoted to bosses 274 on the end frame plate 140, by means of a pin 275. The dog comprises a rearwardly extending portion 276 which is normally displaced toward the left by means of a leaf spring 277 on the left hand side or outside of the frame plate 140. This spring normally holds the dog 249 in the position shown in Fig. 9, the leaf spring 277 also serving as a stop for the dog 249 against which it is held weakly by means of a coil spring 278 located around the pin 275, the ends of this coil spring being connected to the dog 249 and to the frame plate 140. The forward edge of the dog 249 is located so that it clears the pins 103 which have not been pressed inwardly. When, however, one of the pins 103 is pressed inwardly, as shown in Fig. 9, its inner end is brought into the path of the dog 249. Consequently, as the carriage 120 moves downwardly, as viewed in Fig. 9, the dog 249 is arrested by the pin 103, which has been pressed inwardly, and the dog is thrown around its axis 275 into the position shown in Fig. 10, that is, the position in which the rear end 276 of the dog 249 is brought into engagement with the outside of the plate 140. The carriage 120 is thereby arrested. When the carriage 120 moves in the opposite direction to return to the starting position, the spring 278 permits the dog 249 to ratchet over any pins which have been pressed inward without stopping the carriage or returning the pin. It may here be noted that a plate 279 normally rests upon the upper side of the dog 249, as shown in full lines in Fig. 7. As the dog 249 moves from its position shown in Fig. 9 to the position shown in Fig. 10, the plate 279 is freed to drop downwardly, and it is so located that it strikes the pin 103 which arrested the carriage 120. If the carriage has been arrested by one of the upper pins 103, the plate 279 drops to the position shown in dash and dotted lines in Fig. 7. If the carriage has been arrested by a lower pin 103, the plate 279 drops to the position shown in Fig. 34, that is, to a lower position. It is this difference of movement which determines the direction of rotation of the motor and the side of the record on which the tone arm is located during the next playing of a record. The plate 279 is provided with an elongated slot 280 (see particularly Fig. 35) whereby it is slidably mounted on a pin 281, which is rigidly mounted in the frame plate 140. The plate 279 is normally held in its rearward position by means of a spring 282 which is connected to the plate and to the frame plate 140. This spring also biases the plate 279 so that it always tends to move to its lowermost position into engagement with one of the lowermost pins 103. After a record has been played, the plate 279, which is in engagement with the pin 103 which arrested the carriage 120, is pushed forwardly in the manner shown in Figs. 34 and 35 so as to press the selector rod 103 outwardly again. This operation is effected by means of a pusher bar 283 which has a forward slotted end which rides on the pin 281, and a rearward slotted end which rides in a bobbin 284 on the cam shaft 240. The pusher bar 283 is provided with a cam roller 285 which is held by a spring 286 against a cam 287 mounted on the cam shaft 240. When the plate 279 drops, owing to the engagement of the dog 249 with one of the pins 103, a rearwardly directed arm 288 on the plate 279 comes into contact with one of the arms of the bell crank lever 182 so as to move it in the clockwise direction, as viewed in Fig. 7, with the results, previously referred to, of releasing the clutch spring 180 through which the drive of the carriage 120 is actuated and of initiating a semi-rotation of the cam shaft 240, owing to the release of the dog 184.

It may here be noted that the cam 287 is shown in the record playing position in Fig. 26 and that it commences to rotate to approximately 135 degrees in the counterclockwise direction immediately after the record has been played. Consequently, the projection 289 moves the bar 283 forwardly immediately after the playing of a record so as to discharge or move forwardly the pin 103 with which the plate 279 is engaged, in the manner shown in Fig. 35. Immediately after the discharge of the pin 103, the cam roller 285 drops into a recess 290 of the cam 287, with the result that the spring 286 retracts the pusher bar 283 into a position rearwardly of its normal position shown in Fig. 7. In moving to this extreme rearward position, a pin 291 is engaged by the end of a recess 292 formed on the upper side of the pusher bar 283 so that the plate 279 is swung around the pin 281 in the clockwise direction, as viewed in Figs. 7 and 34. When the plate 279 clears the dog 249, the same moves to the right into a position beneath the plate 279, and the plate is thus supported until the carriage 120 is again arrested.

In the event that the carriage 120 is arrested by a pair of pins 103 corresponding to one record, then the plate 279 engages the uppermost pin 103 and the left hand side of the corresponding record is played. At the end of the playing, the pusher bar 283 discharges the topmost pin 103 and then raises the plate 279 upwardly. Owing, however, to the engagement of the dog 249 with the lowermost pin 103, the plate 279, when released, drops down, not on top of the dog 249, but directly on top of the lower pin 103. Consequently, when the dog 184 comes around to the position where it would engage the projection 293 (see Fig. 7) on the bell crank lever 182, that projection is out of the orbit of the dog 184, so that the cam shaft 240 continues rotating for another part revolution corresponding to the return of the same record to the turntable for initiation of the playing of the right hand side thereof.

Referring further to Fig. 7, bell crank lever 182 is provided with a second projection 294 which is adapted to enter the recess 295 provided at one position on the periphery of a disc 296. The disc 296 is keyed to the cam shaft 240, and it pivotally carries the dog 184, previously referred to. A notched wheel 297 is located adjacent the disc 296 and is rigidly mounted on the hub of a worm gear 298, which is freely mounted on the cam shaft 240 (see Fig. 16). The dog 184 is provided with a detent 299 which is adapted to enter any of the notches in the wheel 297 under the influence of a spring 300 carried by the disc 296. With reference to Fig. 7, it will readily be noted that when the bell crank lever 182 is swung in the clockwise direction, the spring 300 will urge the detent 299 against the periphery of the wheel 297 so that it will enter the first notch in the periphery presented to it. Consequently, the disc 296 and the cam shaft 240 will perform a rotation in the counterclockwise direction, as viewed in Fig. 7, to the extent of about 225 degrees. This movement is terminated by the engagement of the dog 184 by a detent 301 in the manner shown in Fig. 50. It is to be noted with reference to Fig. 7 that the recess 295 is located in the disc 296 adjacent the dog 184 so that the projection 294 is able to enter the recess 295 at a time when the dog 184 is near the projection 293 so as to be actuated thereby. The projection 294 can only enter the recess 295 when the plate 279 is resting upon the upper edge of the dog 249, which corresponds to the necessity of the carriage 120 to be translated on its ways or guide tubes 118 and 119 to a position in which it is arrested by engagement with one or a pair of the pins 103 pressed inwardly. When the disc 296 is rotated out of the position shown in Fig. 7, which occurs immediately after the carriage has been arrested, the projection 294 can only bear against the arcuate periphery of the disc 296, which prevents upward movement of the detent 181. Consequently, the clutch provided by the spring 180 is held inoperative by the detent 181, except at the time when the carriage must move in search of a depressed pin 103.

When the pusher bar 283 has been retracted rearwardly from its normal position, corresponding to the recess 290 of the cam 287, in the manner previously described, so that the plate 279 is swung in the clockwise direction, as viewed in Fig. 34, owing to the engagement of the bar 283 with the pin 291 carried by the plate 279, this plate engages a pin 302 carried by a sector 303, which is rigidly mounted on a shaft 304. The extreme rearward position of the pusher bar 283 is shown in dotted lines in Fig. 7, and it will readily be seen that when it moves to its extreme position, the sector 303 is thrown in the counterclockwise direction, as viewed in this figure, so that it may be latched in the position shown by means of a latch lever 305. This latch lever 305 is pivotally mounted on the pin 281 and is biased towards latching position, that is, the position in which it is shown in Fig. 7, by means of a spring 306 connected to the latch and to the plate 279. The spring 306 is so located that when the plate 279 drops onto an upper pin 103, the latch 305 is still held in latching position. When, however, the plate 279 drops onto a lower pin 103, the latch 305 is engaged by the pin 291 on the plate 279 to bring the latch 305 into unlatched position (Fig. 34).

Also rigidly mounted on the shaft 304 is a switch disc 307 (see Figs. 27 to 30), which is provided with abutments 308 and 309 adapted to engage the lever 310 of a reversing switch 311. It may here be noted that the reversing switch 311 has the function of reversing the direction of operation of the motor 147. The disc 307 is biased by a spring 307$^1$ so that it tends to remain in a certain definite position, which is the position shown in Fig. 29. Fig. 27 shows the position into which it is moved when latched by engagement of the latch member 305 with the sector 303, which is rigidly connected to the disc 307 through the shaft 304. It will be noted that in moving between the two positions shown in Fig. 27 and Fig. 29 and vice versa, the disc 307 does not actuate the switch arm 310, but allows it to remain in the condition in which it was before the movement occurred. The disc 307 carries adjacent its periphery a roller 312. A bar 313 is slidably mounted on spools 314 and 315 carried by the shaft 304 and the cam shaft 240 respectively. The bar 313 carries a wedge member 316 which is adapted to cooperate with the roller 312. The wedge shape member 316 is adapted to be forcibly moved against the roller 312 by means of a cam 317 mounted on the cam shaft 240, which cam is adapted to cooperate with a cam roller 318 mounted on the sliding bar 313. When the disc 307 is in the condition shown in Fig. 27, which corresponds to the disc 307 being latched, in the manner shown in Fig. 7, which in turn corresponds to the engagement of the plate 279 by an upper pin 103, then the point of the wedge shape member 316 will engage a low point on the roller 312, and consequently the disc 307 will be rotated in counterclockwise direction, as viewed in Fig. 27. Owing to this movement, the projection 308 on the disc 307 will throw the switch arm 310 to the right, and the record will be caused to rotate in the clockwise direction, as viewed from the left in Fig. 1, so that it is adapted to play the left hand side of a record corresponding to an upper button 104. This same counterclockwise rotation of the disc 307, as viewed in Fig. 27, brings a pin 319 on the disc 307 into engagement with one side of the toothed sector 228. The sector 228 is freely mounted on a shaft 304, and it is normally free to move as the tone arm moves across the record during playing. When engaged by the pin 319 and rotated in the counterclockwise direction, as viewed in Fig. 27, it causes the tone arm to move from whatever position it is in, downwardly to its lowermost position, corresponding to the initiation of the playing of a record of the largest size on the left hand side. In so moving the tone arm downwardly, it may turn around in the manner shown in the second illustration of Fig. 32, as previously described.

When a right hand side of a record is to be played, the switch disc 307 is unlatched, as previously described, and is held in the position shown in Fig. 29, under the influence of the spring 307¹, as shown in Fig. 29. It will be understood from this figure that the apex of the wedge member 316, when the bar 313 is moved axially, will strike an upper part of the roller 312, and that the switch disc 307 will be thrown in the clockwise direction. This movement of the switch disc will, as shown in Fig. 30, throw the switch arm 310 into a position for driving the record in the counterclockwise direction, as viewed from the left in Fig. 1, if it was not already in that position. This movement of the switch disc 307 also brings a pin 320, carried by the switch disc, into engagement with the sector 228 so as to swing the tone arm upwardly into the extreme position for playing the right hand side of the largest record. In so moving the tone arm upwardly, it may be necessary for it to rotate the tone arm about its axis in the manner corresponding to the first illustration of Fig. 32, as already described.

Automatic means are provided to bring the tone arm into initial position for playing records of smaller size, for example, 10 inch records. This means may suitably comprise a sliding bar 321 (see Figs. 46 and 47), which is arranged parallel to the sliding bar 313, being guided by bobbins 322 and 324 on the shafts 304 and 240 respectively. The bar 321 may carry an abutment 325 which is adapted to be contacted by a lever 326 under certain circumstances, as will hereinafter be explained, so that the bar is moved towards the shaft 217 if a 10 inch record is being supplied to the turntable mechanism. Thus, with reference to Figs. 28 and 46, which show operations of the tone arm assembly thrown into position to play the left hand side of a 12 inch record, owing to the fact that a 10 inch record is supplied to the turntable means, the lever 326 is actuated in a manner hereinafter to be described, so as to move the bar 321 into the position shown in Fig. 47. In moving to this position, a wedge shape member 327, carried at the upper end of the sliding bar 321, engages the pin 272¹ on the plate 271 so that the tone arm assembly is swung upwardly a definite amount, corresponding to the distance necessary for the pickup to move from the initial playing position of a 12 inch record to the initial playing position of a 10 inch record. It will readily be understood with reference to Fig. 30, which shows operations of the tone arm assembly into initial playing position of the right hand side of a 12 inch record, that the sliding bar 321 would similarly engage the pin 272 so as to swing the tone arm downwardly into the initial playing position of a 10 inch record.

It will be noted in Fig. 46 that the wedge shape member 327, when the bar 321 is in its normal position, serves as a stop so as to arrest the tone arm in initial position for playing a 12 inch record. This position may be adjusted, if necessary, by moving the wedge shape member 327 in the longitudinal direction on the bar 321. The wedge shape member 327 is provided with a longitudinal slot 328, through which pass flat headed pins 329, which secure the wedge shape member 327 to the bar 321. The lower or inner end of the member 327 is turned laterally to provide a web 330. A screw 331, carried by the bar 321 and extending in the longitudinal direction thereof, passes through an opening in the web 330. A spring 332 is coiled around the screw 331 and abuts against a bracket 333 on the bar 321, which carries the screw 331, and against the web 330, so that it normally forces the wedge shape member 327 forwardly. The forward movement of the wedge shape member 327 is limited by a nut 334 which is threaded on the forward end of the screw 331. It will readily be understood that by merely manipulating the nut 334, the normal position of the wedge shape member 327, as shown in Fig. 46, may be definitely determined. It will be seen by comparing Fig. 46 and Fig. 47 that when the tone arm moves from initial 12 inch position to initial 10 inch position, the pin 272¹ or the pin 272, as the case may be, moves along one of the inclined surfaces of the wedge shape member 327 to an extent depending upon the throw of the bar 321. As previously described, the throw of this bar is effected by an oscillatory movement of a lever 326, which engages a web 325 on the bar 321. Effective movement of the bar 321 may be adjusted so that the pickup needle moves inward a distance of one inch in the change represented by Figs. 46 and 47, by adjusting the lever 327 relative to the shaft 183, upon which it is rigidly mounted, with the aid of a set screw 336. It may here be noted that when the tone arm is in a practically horizontal position, that is, when the pickup arm lies in a horizontal plane, which also includes the axis of rotation of the turntable, the plate 271 lies in symmetrical relation to the pusher bars 313 and 321, both of which are slidably mounted on the shafts 304 and 240.

The plate 337 is pivotally mounted on the shaft 304, as shown in Figs. 48 to 50. The plate 337 has pivotally mounted thereon two dogs 338 and 339 which are similar but are oppositely directed. The forward or outer ends of the dogs 338 and 339 lie in the plane of the plate 271 and are adapted to engage the arcuate edge 273 of that plate, as shown in Fig. 48. A spring 340, connected to the plate 337 and to a pin 341 carried by one of the frame members, tends to hold the plate 337 in alignment with the pusher bars 313 and 321, this position of the plate 337 being shown in Fig. 49. The lower or inner end of the plate 337 is provided with an axial slot 342, which is in alignment with one end of the detent 301 when the plate 337 is in the normal position shown in Fig. 49 into which it is biased by the spring 340. The detent 301 is biased away from the slot 342 by a spring 343, which is quite weak and is adapted to be overcome by the spring 300 of the dog 184, which is adapted to contact it.

It may be pointed out here that when the dog 184 is released by the downward movement of the lever 182 (Fig. 7), it engages the notched wheel 297, and the disc 296 and cam shaft 240 are rotated approximately 225 degrees in the counterclockwise direction, as viewed in Fig. 7. This partial revolution is terminated by the engagement of the detent 301 with the tail of the dog 184. This occurs when the plate 337 is displaced from its normal position shown in Fig. 49. The spring 300 of the dog 184 depresses the detent 301 against the end of the plate 337, but owing to the fact that the end of the detent is unable to enter the slot 342, the dog 184 is disengaged from the notched wheel 297, for example, as shown in Fig. 50. To put the cam shaft 240 again into operation, it is necessary to bring the plate 337 into the position shown in Fig. 49, whereupon the end of the detent 301 enters the notch 342 and allows the dog 184 to engage the notched wheel 297. When this occurs, the disc 296, together with the cam shaft 240, is subjected to approximately 135 degrees rotation, the movement being stopped by the engagement of the dog 184 with the projection 293 on the lever 182, as shown in Figs. 3 and 48.

I have previously described the manner in which the switch disc 307 and the shaft 304 on which it is rigidly mounted are swung in one direction or the other, before a record is played, by means of the pusher bar 313. To play the left hand side of a record, the shaft 304 is displaced in the counterclockwise direction, as viewed in Figs. 27, 28, and 48. The plate 337 is provided with a boss 344 shown in Figs. 48 to 50 which is provided with a slot 345 in which is located a pin 346 carried by the shaft 304. The counterclockwise movement of the shaft 304 is such that the pin 346 engages the end of the slot 345 and moves the plate 337 slightly in the counterclockwise direction, as viewed in Fig. 48. At the same time, the plate 271 is carried into the position shown in Fig. 48, and the dog 338 is clear of the plate 271. Consequently, this dog 338 is pressed by a spring 347 against an abutment 348 so that its outer or forward edge is directed towards the arcuate surface 273 of the plate 271. When the pusher bar 313 retracts, the shaft 304 returns to the normal position shown in Fig. 48, and the dog 338 is brought into abutting relation with the arcuate surface 273 of the plate 271. This abutting relation is such that the slot 342 is maintained out of alignment with the detent 301, as shown in Fig. 48. Consequently, when the cam shaft 240 has turned sufficiently to bring the dog 184 into contact with the detent 301, the drive of the cam shaft is interrupted. It will be noted with reference to Fig. 48 that during the playing of a record, that is, the left hand side of a record, the plate 271 will rotate in the counterclockwise direction and that the arcuate surface 273 of the plate 271 will pass over the outer end of the dog 338. This arcuate surface is of sufficient length to permit the playing of any standard record, the surface 273 being of such length that it will clear the dog 338 before the pickup needle runs into the end groove of any conventional record. When the arcuate surface 273 does so clear the dog 338, the spring 340 swings the plate 337 into its normal position shown in Fig. 49, with the result that the detent 301 enters the recess 342 and permits the dog 184 to engage the notched wheel 297, thus initiating record changing operations. In the event of certain records which are provided with an eccentric end groove which does not cause the arcuate surface 273 of the plate 271 to clear the dog 338, then the reverse movement of the plate 271, that is, the clockwise movement of the plate 271, as viewed in Fig. 48, will trip the dog 338 and permit the spring 340 to move the plate 337 so as to bring the notch 342 into alignment with the detent 301, with the results pointed out above. The detent 339 is provided with a spring 349 which tends to force it against an abutment 350. This detent 339 is brought into engagement with the arcuate surface 273 of the plate 271, as shown in Fig. 50, when the right hand side of a record is to be played. In this case, the motion of the plate 271 during normal playing is in the clockwise direction, and the dog 339, being arranged oppositely the dog 338, the cooperation between the plate 271 and the dog 339 is substantially the same as that just described with reference to the dog 338. With reference to Fig. 50, it is to be noted that movement of the tone arm into the position to play a right hand side of a record is accompanied by a displacement of the shaft 304 in the clockwise direction, as viewed in Figs. 29, 30, and 50, so that the manner in which the dog 339 is cocked, as shown in Fig. 50, will be readily understood.

The transfer of the records from and back to the magazine and the movements of the records to locate them properly with respect to the turntables 191 and 192 and the centering pin 199 are controlled by the cam 351, rigidly mounted on the cam shaft 240. The cam 351 is adapted to cooperate with a cam roller 352 (see Figs. 36 to 39), which is carried by a bifurcated bar 353, the forked end of which is guided on a bobbin 354[1] on the shaft 240. The lower or rearward end of the bar 353 is pivotally connected to a short arm 354, which is rigidly mounted on a shaft 355 which has bearings in the two frame plate members 141 and 140 and projects to the left hand side thereof, as shown in Fig. 39. A forwardly extending link 356 has its rear end pivotally connected to the short arm 354. The forward end of the link 356 is provided with a slot 357 which engages a pin 358 carried by a short arm 359 which is rigidly mounted on the shaft 183. The shaft 183 is rotatably mounted on the frame plates 140 and 141 and extends to the left beyond the plate 140. At the left hand end of the shaft 355, that is, the upper end of that shaft, as shown in Fig. 39, is mounted a rearwardly extending arm 360. This arm is provided with a boss 361 whereby it is free to rotate to a limited extent relative to the shaft 355. The boss 361 is provided with a notch 362 in which is located a pin 363, which is carried by the shaft 355. The arm 360 is in vertical alignment with the record position in the magazine and in playing position on the carriage, this arm being adapted to enter into the space 117 in the comb-like structure 116, which corresponds to the record being played. When the carriage is traveling, the arm 360 has the position shown in Fig. 41 so that it clears the comb 116 and the bars 111 and 112 which serve as supports for the records in the magazine. It is held in this position by the engagement of the pin 363 with the boss 361 against the action of a spring 364 which is connected to the arm 360 and to a small guide or runway 365, which is rigidly mounted on the carriage 120 above the forward end of the arm 360 as shown in Figs. 4, 5, and 41 to 45. The arm 360 is provided with a recessed rear end 366, which is adapted to receive the record thereabove. On the left hand side of the frame member 140 and near the position of the record to be played, the shaft 183 carries an arm 367 which carries at its end a grooved button 368, which is adapted to support the record. This button is offset so that it is in the plane of the record being played. In alignment with the button 368 is a button 369 carried by an offset arm 370, which is mounted on the shaft 355 by means of a boss 371. Between the arm 370 and the frame plate 140 is rotatably mounted a ring 374 which abuts against the boss 371 of the arm 370 and against a spacing washer 375, rigidly mounted on the shaft 355 by means of a pin 376. Mounted on the boss 371 of the arm 370 is a pin 377. The ring 374 carries a pin 378 which projects into the path of the pins 376 and 377. A spring 379 is connected to the pin 378 and to the arm 370. This spring is such that when the shaft 355 is rotated in the clockwise direction, as viewed from the bottom of Fig. 39, the pin 376, as viewed from the bottom of Fig. 39, the pin 376, owing to its engagement with the pin 378, causes the ring 374 to rotate in the same direction and the connection provided by the spring 379 between the pins 378 and the arm 370 will cause this arm to rise resiliently in the clockwise direction, as viewed from the right hand side of the machine. A spring 380 connected to the frame member 140 and to the short arm 354 tends to move that arm in counterclockwise direction, as viewed from the right hand end of the machine, that is, as viewed in Fig. 38.

The arm 367 carries at an intermediate point a projecting pin 381 which is adapted to be engaged by a flange 382 on the upper edge of the arm 370. As will be best understood from Fig. 38, the arrangement is such that the arm 370 may rise independently of the arm 367, but if the arm 367 rises, then the arm 370 likewise rises. As will be best understood from Fig. 40, the arms 367 and 370 are displaced slightly to permit relative movement of the arms, but the buttons 368 and 369 carried by these arms are in alignment.

The relation between the cam 351 and the cam roller 352 during playing of the record is that shown in Fig. 26. This corresponds to the position of the arms shown in Fig. 44, the record being one of the smaller size, for example, a ten inch record. After a record has been played and the cam shaft 240 is put into operation in the counterclockwise direction, as viewed in that figure, the cam roller, moving off the arc 383 of the cam 351 along the fall 384 of the cam, causes the short arm 354 to swing the shaft 355 in the counterclockwise direction, as viewed from the right hand end of the machine, that is, as viewed in Fig. 38. Consequently, the link 356 moves to the left, as viewed in that figure, and causes a slight rotation of the shaft 183 in the counterclockwise direction. This movement of the shaft 183 causes the arm 367 to swing in the same direction, and the engagement of the pin 381 with the flange 382 of the arm 370 causes this arm also to elevate into the position shown in Fig. 45.

Figure 41:
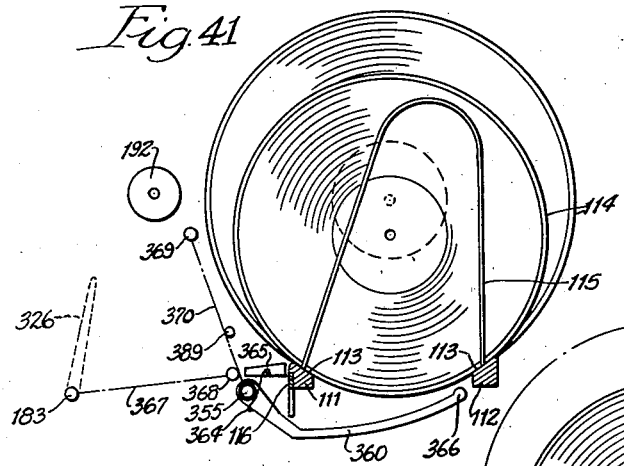
Figure 45:
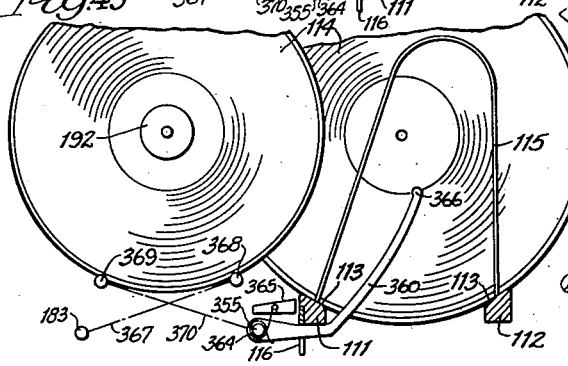

While the arms 367 and 370 are moving into the position shown in Fig. 45, the cam 245 has effected the retraction of the turntable member 192 from the record, and when the arms 367 and 370 reach the position shown in Fig. 45, the cam 245 effects the withdrawal of the centering pin 199 out of the record. The record therefore rests upon the grooved buttons 368 and 369. Continued rotation of the cam 351 in the counter-clockwise direction, as viewed in Fig. 26, causes the roller 352 to move over the rise 385 of the cam. During this movement, the short arm 354 is rotated in the clockwise direction, with the result that the arm 367 is free to move downwardly under the action of a spring 386 which connects the short arm 359 to a part of the frame. The weight of the record resting on the button 369 depresses the arm 370 so that it follows the arm 367. This downward movement of the arm 370 is permitted by the rotation of the shaft 355, which has brought the pin 376 away from the pin 378 in the left hand direction, as viewed in Fig. 39. Consequently, the arm 370, the boss 371, the disc 374, the pins 377 and 378, and the spring 379 pivot as a unit on the shaft 355. The downward movement of the arms 367 and 370 continues until they reach the position shown in Fig. 43. Continued movement of the roller 352 up the cam rise 385 causes clockwise rotation of the shaft 355, as viewed in Fig. 38, so as to elevate the arm 370 into the position shown in Fig. 42. It will be noted that the elevation of the arm 370 rolls the record over the guide 365 to a position where it tilts over the bar 111 into the magazine. When this happens, the record rolls against the button 366 on the rearwardly extending arm 360 in the manner shown in Fig. 42. This happens shortly after the rotation of the shaft 355 has brought the pin 363 into contact with the end of the slot 362 on the boss of the arm 360, so that this arm is moving downwardly against the action of the spring 364. Continued rotation of the shaft 355 as the roller 352 moves up the rise 385 brings the arm 370 into contact with a stop 389 mounted on the frame plate 140 as shown in Fig. 41. This stop is in alignment with the main portion of the arm 370, but is out of alignment with the button 369 which lies in the plane of the record. Consequently, the stop 389 does not foul the record. The continued rotation of the shaft 355 is accompanied by a tensioning of the spring 379 which permits the necessary lost motion between the arm 370 and the shaft 355 when the arm 370 is thus arrested. During the continued rotation of the shaft 355 in the clockwise direction, as viewed from the right hand end of the machine, the arm 360 moves downwardly from the position shown in Fig. 42 into the position shown in Fig. 41. The record is now returned to the magazine and the carriage 120 is free to move in search of another button 104 which has been pressed inwardly. Of course, if the lower button corresponding to that record has been pressed in, the carriage will not move, but the same record will be moved out of the magazine for playing of the right hand side.

When a selected record is to be removed from the magazine, the cam roller 352, being on the arcuate surface 387 of the cam 351, and the cam shaft 240 being put into rotation in the counterclockwise direction, the cam roller 352 moves down the fall 388 of the cam 351. Consequently, shaft 355 turns in the counterclockwise direction, as viewed in Fig. 38. The arm 360 enters into the recess 117 of the comb 116, corresponding to the selected record. Continued movement of the cam 351 raises the arm 360 and later begins to lower the arm 370. Eventually, the selected record is elevated into the position shown in Fig. 42, and shortly thereafter, the record rolls out over the guideway 365 into contact with the button 369 on the end of the arm 370. Continued rotation of the shaft 355 in the counterclockwise direction brings the arm 360 into its uppermost position, shown in Fig. 43. At the end of the fall 388 on the cam 351, there is a rest 390 which corresponds to the point at which the centering pin 199 is projected out of the turntable 192. This occurs when the record has reached the position shown in Fig. 43. Continued rotation of the cam 351 brings the roller 352 into a recess 391 on the cam 351, with the result that the spring 380, throwing the short arm 354 in the counterclockwise direction, as viewed in Fig. 38, so as to move the roller 352 toward the cam shaft 240, throws the link 356 to the left, as viewed in Fig. 38, and the end of the slot 357, coming into contact with the pin 358, throws the arm 367 upwardly. This upward movement of the arm 367 effects the raising of the arm 370, and consequently, the elevation of the record up to the position shown in Fig. 45. In this position, the center hole of the record is in alignment with the pin 199, and this pin is free to move into the opening in the record. Continued movement of the cam 351 locates the roller 352 on the rest 383, and the reverse movement of the short arm 354, that is, its clockwise movement as viewed in Fig. 38, permits the arm 367 to drop downwardly, accompanied by the arm 370, into the position shown in Fig. 44.

Figure 42:
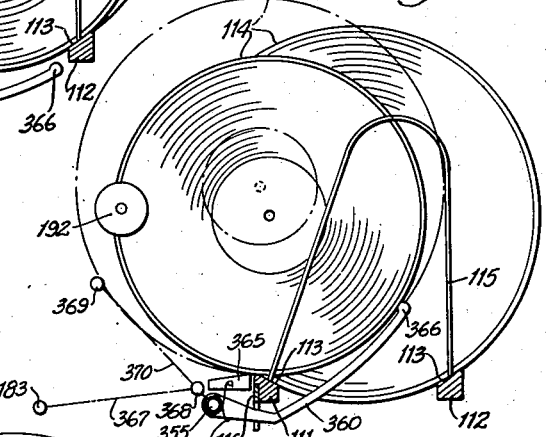
Figure 43:
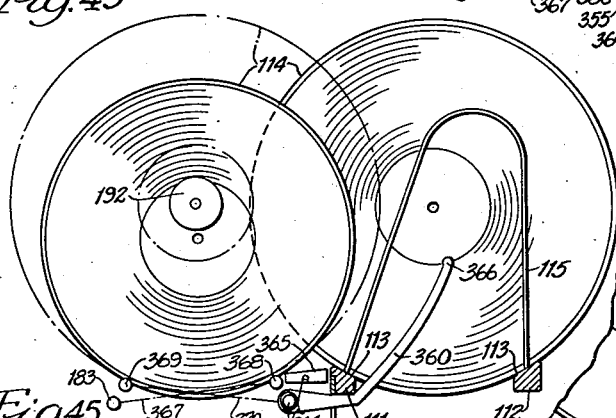
Figure 44:
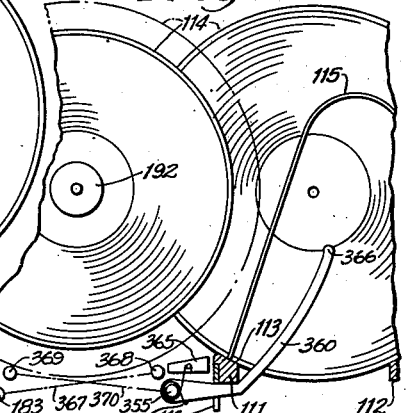

When a record of the larger size, for example a 12 inch record, is being transferred from the magazine, the record is first contacted by the arm 360 as it moves upwardly, and the record is carried forwardly until it hits the button 369 on the outer end of the arm 370. When this occurs, the arms 360 and 370 move as a unit, the spacing between the arms, shown in Fig. 42, enabling them to receive the larger record between them. The simultaneous swinging of the arms 360 and 370 continues until the arm 360 is arrested by the bar 111, and the record then follows the arm 370 until that arm arrives at the position shown in Fig. 43. The record then rests upon the buttons 368 and 369, and at that point the centering pin 199 is released. As the cam roller 352 enters the recess 391, the spring 380 causes the arms 367 and 370 to elevate upwardly, bringing the opening of the record into alignment with the pin 199, which then enters that opening. It may here be noted that the spring 380 is of such strength that it readily elevates a smaller record through the larger distance necessary for such record. Preferably, however, this spring is effectively opposed by the weight of the larger record, and consequently, while it raises this record to some extent so as to bring the opening of the record into alignment with the pin 199, still the arms 367 and 370 are preferably not biased sufficiently to move the larger record to the same degree as the smaller record. This lost motion is provided by the failure of the spring 380 to keep the cam roller 352 in contact with the recesses 391 and 384 of the cam 351. When the roller 352 rides on the cam rest 383, the arms 367 and 370 are brought into the position shown in Fig. 44, clear of the larger record, which is shown in dash and dotted lines. When a larger record is to be returned to the magazine, the arms 367 and 370 move upwardly from the position shown in Fig. 44 towards the position shown in Fig. 45. They do not reach this position, however, in the case of a large record, because the buttons 368 and 369 engage that large record at a short distance above their initial positions. When the pin 199 is withdrawn, the large record may be moved up slightly towards the position shown in Fig. 45, but if the spring 380 is of the strength indicated above, this movement will not be considerable. Continued rotation of the cam 351 will have the effect of moving the arms 367 and 370 definitely into the position shown in Fig. 43, and thereafter the arm 370 will rise to the position shown in Figs. 42 and 41. When the large record contacts the button 368 and the arm 360, as shown in Fig. 42, the arm 360 will move downwardly until the position shown in Fig. 41 is attained.

Referring to the wiring diagram of Fig. 57, the switch 132 controls the supply of current to the motor 147, while the switch 311 controls the direction of rotation of the motor. While any suitable motor and reversing means may be employed, I prefer to use an alternating current motor of the split phase capacitor type. This motor may include a winding 392 and a winding 393 in series with a capacitor 394. The winding 392 is connected directly to the alternating current supply, whereas the circuit, including the winding 393 and the capacitor 394, are connected thereto by means of the switch 311. This switch is a double pole, double throw switch, adapted to effect the connection of said circuit to the source of alternating current in opposite directions.

The cable 395 from the pick-up extends through the arm 207 and one turn or so may be wound around the bushing 213 of the frame 214, as shown in Fig. 4. Thence it extends downwardly to the motor 147, where it is united with the motor leads into a cable 396. This cable extends around a sheave 397 (Fig. 1) to a position 398 on the cabinet to which it is anchored. The pick-up leads extend from this position to a suitable amplifier 399, the output of which is connected to a loud speaker 400. The cable 396 is of sufficient length to permit the full travel of the carriage 120 in both directions. The sheave 397 is resiliently held taut by a spring 401 anchored to the cabinet in such a position that the cable 396 is always held taut.

One of the advantages of my invention resides in the fact that the carriage 120 includes practically all the operating parts and that this carriage can be employed in machines operable with comparatively few, or with an unlimited number of records. Thus the machine shown in Fig. 1 is adapted for one hundred records. A machine for fifty records would be quite similar but would be somewhat shorter. The right hand end wall of the cabinet could then occupy the position shown in dot and dash lines on that figure. Change of number of records involves merely change of length of the bars 123, 118, 119, 111, and 112, and the change to the corresponding number of rods 103. In case the machine is adapted for a large number of records, the load on the magazine bars 111 and 112 may become excessive, and they may be supported at suitable intervals by rods 402 (see Fig. 7), which are arranged to clear the slots 155 in the frame plates 140 and 141.

The operation of the phonograph is as follows:
Buttons 104, corresponding to the selections which are desired, are pushed inwardly and the start button 105 is also pushed inwardly. The start button 105 is locked in its inward position by the latch 134. Thus the switch 132 is maintained closed and the motor 147 is put into operation. The direction of rotation of the motor depends upon the present position of the switch 311. Irrespective of the direction of rotation of the motor, the cam shaft and carriage driving shaft 168 is driven in the counterclockwise direction, as viewed from above, and the arms 185 are swung around bodily to bring the carriage driving wheel 187 into contact with the tube 118, thus effecting the drive of the carriage 120 to the right. The latching of the starting switch is permitted by the movement of the carriage 120 away from the latch 134. The translation of the carriage 120 continues until it is arrested by one of the rods 103 which has been pressed inwardly.

It may be remarked that at the end of the complete cycle, the beginning of which is now about to be described, the cam 287 pushes the bar 283 forwardly and the recess 290 on that cam has permitted the bar 283 to move back to an extreme rearward position temporarily, thus effecting the engagement of the latch 305 with the sector 303. Consequently, at the instant the carriage is arrested by any of the buttons 103, the switch disc 307 remains in the position shown in Fig. 27. If the carriage 120 is arrested by an upper pin 103, this pin engages the dog 249 and swings it from the position shown in Fig. 9 into the position shown in Fig. 10. In the latter position, the plate 279 falls upon the upper pin 103. Owing to the limited downward movement of the plate 279, the latch 305 remains in engagement with the sector 303, and the switch disc remains in the position shown in Fig. 27. The partial rotation of the cam shaft initiated by the withdrawal of the abutment 293 from the dog 184 (Fig. 7), causes the cam 317 to force the bar 313 forwardly and upwardly. The engagement of the wedge 316 on this bar with the roller 312 on the switch disc 307 causes the disc to rotate in the counterclockwise direction, as viewed in Fig. 27. This movement throws the switch arm 310 to the right, if it is not already in that position, and the motor is set thereby to drive the record in the clockwise direction, as viewed from the left end of the device. During this movement of the disc 307, the pin 319 engages the sector 228 and the tone arm is thrown downwardly to a position to play the left hand side of a record, that is, to the tone arm position shown in dash and dotted lines in Fig. 4. If the instrument had last played the right hand side of a record, the tone arm is moved a considerable distance in the downward direction and is rotated axially in the manner previously described, so that the needle is now presented toward the left hand side of the record. If a recording on the left hand side of a record had been played last, the tone arm is merely moved down from the position shown in full lines in Fig. 4 to the position shown in dash and dotted lines in Fig. 4.

If the dog 249 had been arrested by a lower pin 103, the greater movement of the plate 279 releases the latch 305 from the sector 303 so that the switch disc 307 promptly moves to the position shown in Fig. 29. Consequently, when the bar 313 is forced outwardly and upwardly by the cam 317, the switch disc 307 is rotated in the clockwise direction, as viewed in Fig. 29. This partial rotation of the switch disc throws the switch arm 310 to the left, if it is not already in that position. Consequently, the motor is set to drive the record in the counterclockwise direction, as viewed from the left end. This movement of the switch disc 307 brings the pin 320 into engagement with the sector 228 and throws this sector in the clockwise direction, as viewed in Fig. 29. Consequently, the tone arm is thrown up to the position corresponding to the dash and dotted lines 403 in Fig. 4, that is, to a position corresponding to the initial playing of a 12 inch record on the right hand side thereof. If the device had last played the left hand side of a record, the tone arm is carried approximately from the full line position shown in Fig. 4 to the position 403, and in so moving, the tone arm is rotated axially so that the needle is presented towards the right hand side of a record. If the machine had last played the right hand side of a record, the tone arm is merely moved upwardly from a position approximately shown at 404 in Fig. 4.

As the bar 313 moves back again, the tone arm is freed so that it may follow the sound track of the record after it goes into engagement therewith.

While the bar 313 is moving back to its initial position, the roller 352 starts moving over the fall 388 of the cam 351 and the record corresponding to the arresting pin 103 is moved, in the manner described, out of the magazine and into the carriage. When the roller 352 reaches the rest 390, the arms 367 and 370 are in the position shown in Fig. 43, and the record is resting upon the buttons 368 and 369 with the center opening of the record below the centering pin 199. The center opening of a 12 inch record is only slightly below the pin 199, whereas the center opening of a 10 inch record is considerably below the pin 199. Just as the roller 352 reaches the rest 390 of the cam 351, the roller 244 moves into contact with the rest 251 on the cam 245, and consequently, the centering pin is freed so that it bears resiliently against the record. As the roller 352 moves into the recess 391 on the cam 351, the arms 367 and 370 rise towards the position in which they are shown in Fig. 45. In the event the record about to be played is a 10 inch record, the arms 367 and 370 move into the position shown in Fig. 45, and in this position the centering pin 199 is able to enter the center opening of the record. If the record to be played is, however, a 12 inch record, the pin 199 enters its center opening after very slight upward movement of the arms 367 and 370, and further upward movement of these arms is prevented. In the case of a 10 inch record, the greater upward movement of the arm 367 swings the arm 326 so as to move the bar 321 (Fig. 47) so as to throw the tone arm inwardly, by engagement with the pin 272 or the pin 272¹, so as to locate the needle at the initial 10 inch playing position. When the roller 352 moves from the recess 391 to the rest 383, the arms 367 and 370 move downward into the position shown in Fig. 44, that is, a position in which they are clear of the record so that the same may be rotated for playing. While the roller 352 is still on the rest 383, the cam roller 244 moves into the recess 252 on the cam 245. Consequently, the record is clamped between the two turntables 191 and 192 so that the record is caused to rotate in the appropriate direction. Further movement of the cam 245 locates the roller 244 upon the lowest portion of the cam 245, as shown in Fig. 26, so that the needle is now allowed to move into contact with the record. The cam shaft 240 is now arrested by the engagement of the dog 184 by the detent 301 in the manner shown in Fig. 50. It will be noted that the rotation of the shaft 240 and the dog 184 from the position shown in Fig. 48 to the position shown in Fig. 50 corresponds to a partial rotation of about 225 degrees. The position of the various cams during the playing of a record, relative to their cam rollers, is shown in Fig. 26.

During the initial portion of this partial rotation of the cam shaft 240, the tone arm is thrown to the appropriate extreme position. Consequently, the sector 271 is carried outwardly with respect to one of the dogs 338 or 339. This has the effect of upsetting this dog so that the spring 340 is able to pull the plate 337 into its normal position. The detent 301 is held clear of the plate 337 owing to the fact that the dog 184 has just started away from the position shown in Fig. 48. The oscillation of the switch disc 307, which occurs in the very beginning of the partial rotation of the cam shaft just described, results in the oscillation of the shaft 304 and the oscillation of the plate 337, owing to the contact of the pin 346 with the ends of the slot 345. Consequently, the dog 338 or the dog 339, as the case may be, is moved away from the plate 271 and it is again brought into contact with the arcuate edge thereof after it has been returned to the position shown in Fig. 48 by its spring 347 or 349. When in this condition, as shown in Fig. 48, the detent 301 is unable to enter the slot 342, so that the detent 301 remains in the path of the dog 184 to arrest the same, in the manner shown in Fig. 50.

The cam shaft 240 remains at rest until the record is played. During the playing of the right hand side of a record, the plate 271 moves downwardly from the position shown in Fig. 50. When the plate 271 clears the dog 339 or when, in the case of certain records, the plate 271 reverses or oscillates, the plate 271 either clears the dog 339 or upsets it, with the result that the spring 340 draws the plate 337 into the position shown in Fig. 49 and the detent 301, being now able to move into the slot 342 on the plate 337, the dog 184 is released, and the remainder of the rotation of the cam shaft 240, amounting to about 135 degrees, is begun. Fig. 48 corresponds to the playing of the left hand side of a record, and it will be seen that the plate 271 cooperates in substantially similar manner with the dog 338, so as to initiate the latter portion of the cam shaft cycle. This latter portion of the cam shaft cycle will now be described.

During the initial part of this cam shaft movement, the bar 283 is thrust forwardly by the cam 287, thus discharging the pin 103 by returning it to its initial position. It may here be noted that in case both pins 103, corresponding to a single record, have been pressed inwardly, the plate 279, being in engagement with the upper pin, forces this pin only outward after the corresponding left hand side of the record has been played. The roller 285, following the cam 287 into the recess 290, carries the plate 279 rearwardly, owing to the engagement of the bar 283 with the pin 291. This rearward movement of the plate 279 brings it into engagement with the pin 302 on the sector 303, so that the switch disc 307 is brought into the position shown in Fig. 27. At the same time, it is latched in this position by the latch 305. Also at the very beginning of this portion of the cam shaft cycle, the cam roller 244 moves outwardly on the cam 245 into engagement with the portion 246 thereof, lifting the needle off the record. The subsequent movement of the roller 244 onto the higher portion 248 of the cam 245 withdraws the turntable 192 from the record, thus terminating the drive on the record. While the center pin 199 still extends through the central opening of the record, the cam roller 352 moves into the recess 384 on the cam 351 so that the arms 367 and 370 are raised so as to bring their buttons 368 and 369 into engagement with the periphery of the record. The cam roller 244 then moves onto the highest portion of the cam 245 and the center pin 199 is pulled out. Continued movement of the cam roller 352 up the rise 385 of the cam 351 results in the downward movement of the arms 367 and 370 into their position shown in Fig. 43 and the subsequent elevation of the arm 370 into the position shown in Fig. 42 and finally into the position shown in Fig. 41. During these movements of the arm 370, the arm 360 moves downwardly into the position shown in Fig. 41.

It will be noted that when the plate 279 is moved upwardly to effect the latching of the sector 303, it is elevated above the dog 249 so that this dog will, except in the case of a record of which the second side is about to be played, move under the plate 279 so as to hold it in elevated position. This results in the withdrawal of the plate out of contact with the lever 182 so that this lever is elevated out of contact with the detent 154, permitting the clutch of the translational drive for the carriage to be engaged. This engagement of the clutch occurs almost at the end of the complete cycle of the cam shaft, and the translation of the carriage 120 towards the next actuated button is resumed. In the case where both buttons 104 of a single record are actuated, the left hand side of a record is played and the upper button is discharged in the manner described. In this case, however, when the plate 279 is raised in its normal cocking movement, the dog 249 does not move underneath it because it is held by the lower pin 103. Consequently, as soon as the bar 283 moves forward again to its normal position, the plate 279 is free to drop onto the lower pin 103, and the latch 305 is released. The clutch of the translational drive for the carriage is not engaged at this time because the notch 295 in the disc 296 is not in alignment with the projection 294. The carriage is held against movement by the lower pin 103 until the arm 360 is again engaged in the appropriate slot 117 in the comb structure 116.

It will thus be obvious that any of the buttons 104 corresponding to either or both sides of any or all of the records may be pressed inwardly and the starting button 105 may also be pressed inwardly. The selections corresponding to the buttons 104 will be played automatically and successively as the carriage 120 moves from the left hand end of the machine to the right hand end, and when all the selections have been played, the carriage will again move to the left hand side of the machine, and the motor switch is automatically opened.

Although the invention has been described in connection with the specific details of a preferred embodiment thereof, it must be understood that such details are not intended to be limitative of the invention except insofar as set forth in the accompanying claims.

Having thus described my invention, I declare that what I claim is:

1. In an automatic phonograph for playing either face of a double faced record, means for rotatably supporting a record in a plane with both faces exposed, a tone arm having a record engaging and reproducing means projecting therefrom in one direction, means movably mounting said tone arm to direct said projecting means from either side of said plane toward said plane, and means operably associated with said tone arm for moving the same on its mounting selectively to position its projecting means for engagement with either face of a record supported in said plane for playing the same.

2. In a phonograph, a rotatably mounted pickup having a needle for engaging the sound track of a record, a rotatable support for a double faced record having means for rotating the record in a plane with both faces exposed for cooperation with said pickup, and means associated with said pickup for rotating same on its mounting to position said needle for selective engagement with the sound track on either face of the record supported in said plane.

3. In a phonograph for playing double faced disc records on both sides, a record supporting means for supporting and rotating a record in a plane for playing the same, a reproducer having a needle and mounted for rotation on an axis parallel to said plane, and means for moving said reproducer to a position on either side of said record playing plane and for rotating said reproducer on its axis to direct said needle toward said record playing plane.

4. In a phonograph, rotatable supporting means for holding and rotating double-faced disc records in playing position, a reproducer having a record engaging needle, means for effecting relative motion in opposite directions between said reproducer and said supporting means to move said needle and record toward each other in one of said opposite directions to play one side and in the opposite direction to play the other side of a record, and means correlated with said relative motion effecting means for making the latter effective to bring a record and said needle into playing contact.

5. In an automatic phonograph, turntable means for supporting a double faced record in a plane for reproduction on one side or the other, an electric motor operatively connected to said turntable means for driving same and the record supported thereby in either direction, a tone arm rotatably mounted adjacent said turntable for selectively engaging either face of a record carried by said turntable means, means for reversing said motor to reverse said turntable means, and means associated with said reversing means and tone arm for rotating the tone arm on its axis to engage either face of a record.

6. In a phonograph, means for supporting and rotating a double faced disc record in a plane, record engaging and playing means, a support mounting said means for pivotal movement toward and away from said plane, a mounting for said support rotatable about an axis substantially parallel to said plane, means associated with said mounting for moving same about its axis to a position on each side of said plane, and means for pivotally moving said record engaging and playing means into engagement with the corresponding face of a record in said plane.

7. In a phonograph, means for rotatably supporting a record in a record playing plane, a pickup associated with said supporting means to cooperate with either side of a record in said plane, an arm carrying said pickup, a frame member pivotally carrying said arm, a second frame member pivotally carrying first said frame member on an axis generally parallel to said plane, means mounting last said frame member on an axis substantially parallel to the axis of the record supporting means, means associated with said arm for biasing same toward said record playing plane, and cam means associated with said arm for moving same irrespective of its location against the biasing means.

8. In a phonograph, means for rotatably supporting a record in a record playing plane, a pickup associated with said supporting means to cooperate with either side of a record in said plane, an arm carrying said pickup, a frame member pivotally carrying said arm, a second frame member pivotally carrying first said frame member on an axis generally parallel to the arm, means mounting last said frame member on an axis substantially parallel to the axis of the record supporting means, means including a shaft coaxial with second said frame member operatively connected to the first frame member to rotate said frame and said arm, and yieldable stop means cooperating with said second frame for opposing the movement thereof at a definite position, whereby the rotation of said shaft moves both frames and then rotates the first said frame at said definite position.

9. In an automatic phonograph for playing both faces of double faced disc records, record rotating and supporting members for engaging the central portions of both faces of a record to be played leaving the playing grooves on both faces exposed, a member carrying one of said rotating supporting members and extending adjacent the record surface to a point of support therefor beyond the record periphery, a reproducer associated with said member and having needle means, and means for moving said needle means into engagement with one face of a record on said rotating and supporting means, and said means being mounted for movement of said reproducer over said carrying member to bring said needle means into position to engage the opposite face of a record on the opposite side of said carrying member.

10. In a phonograph, record holding means, means associated with said holding means for rotating said record holding means in either direction, reproducing means having a record engaging needle, and means correlated with said record holding and rotating means for causing said needle to engage one face of a double faced record on one side of said record holding means when said record holding means is revolved in one direction, and for causing said needle to engage the other face of said record on the other side of said record holding means when said record holding means is revolved in the opposite direction.

11. In an automatic phonograph for playing double faced disc records, rotatable record supporting means for supporting records, power means connected to said supporting means for rotating the latter in opposite directions, means associated with said power means for controlling the direction of rotation of the supporting means, a pickup, power means connected to said pickup for moving said pickup in opposite directions to locate it in playing relation to records on the supporting means, means for controlling the direction of movement of the pickup, displaceable selector means associated with both said control means, automatic means controlled by said selector means for acting upon said pickup movement direction controlling means to locate said pickup in playing relation to said records and for thereafter acting upon said rotation direction controlling means to effect rotation of said supporting means in one direction or the other, said rotation direction controlling means and pickup movement direction controlling means being correlated to insure corresponding rotation of the supporting means and location of the pickup for the playing of both sides of records.

12. In an automatic phonograph, a magazine for supporting a series of records in spaced relation, means mounted adjacent said magazine for rotatably supporting a record to be played, means associated with said magazine and rotatable supporting means for removing a record from said magazine onto said supporting means, a pickup movably mounted adjacent said rotatable supporting means, and means associated with said pickup for moving said pickup bodily from one side of the record position on said supporting means to the other side thereof and vice versa to effect the playing of either side of a record thereon.

13. In an automatic phonograph, rotatable supporting means for holding and rotating a double-faced disc record in a plane, means associated with said holding and rotating means for supplying one of a plurality of records to said supporting means, a reproducer having a record engaging needle mounted movably adjacent said holding and rotating means, means for moving said needle to either side of said plane, and means correlated in timed relation with said supplying means for bringing said needle into playing contact with the adjacent face of a record rotating in said plane.

14. In an automatic phonograph, a record magazine, a unit including a rotating supporting means for holding and rotating a double-faced disc record in a single playing plane on said unit, said magazine and unit being mounted for movement relative to each other, transfer means associated with said unit and magazine for supplying one of said records from said magazine to said supporting means, depending upon the relative positions of said magazine and unit, reproducer means movably mounted on said unit for cooperation with a record in said playing plane, means for moving said reproducer means on said unit from one side of said plane to the other and vice versa, and means associated with last said means for bringing said reproducer means into playing relation with the adjacent face of a record in said playing plane.

15. In an automatic phonograph, a magazine for supporting a plurality of double faced disc records in adjacent spaced relation to each other, a playing unit adjacent said magazine including means for rotatably supporting a record in a record playing position, means mounting said playing unit and magazine for relative movement, power actuated means for effecting said relative movement, means associated with said magazine and unit for stopping them with the supporting means in cooperative relation with any desired record in said magazine, power actuated means associated with said magazine and playing unit for transferring the desired record from said magazine to said rotatable supporting means, reproducing means movable in one direction into engagement with the playing grooves on one face of the said desired record and in the opposite direction into engagement with the grooves on the other face of said record, and power actuated means for selectively moving said reproducing means in said opposite directions to engage the grooves on either face of the record.

16. In an automatic phonograph, a magazine for supporting a series of vertical records, a player unit including rotatable record supporting means supporting a record to be played in vertical position, said magazine and player unit being relatively movable, means cooperatively associated with said unit and magazine for transferring any record from said magazine to said record supporting means, record engaging and reproducing means movably mounted on said unit, selector means corresponding to each side of each record and associated with said unit and magazine for controlling the arrestment of said relative movement with said transferring means in alignment with the selected record in said magazine, and means correlated with the selector means for moving the record engaging and reproducing means to either side of said record supporting means dependent upon which of the selector means is operated.

17. In an automatic phonograph, a magazine for supporting a series of double faced disc records, a player unit including rotatable means for supporting a record in a plane for playing the same, record transfer means and record reproducing means associated with said unit and magazine, said record reproducing means being mounted for movement to either side of said playing plane to enable it to engage and play both faces of records supported in said plane, power means associated with said unit and magazine for causing relative motion between said magazine and playing unit, two independent stopping means corresponding to each record in said magazine and associated with said unit and said magazine and cooperating with said transfer means for arresting said relative motion when playing alignment is attained between any selected record in said magazine and the record transfer means of said player unit, means associated with said reproducing means and controlled by one of said independent stopping means for locating said reproducing means on one side of the record playing plane, and means also associated with said reproducing means and controlled by the other independent stopping means for locating said reproducing means on the other side of said playing plane.

18. In an automatic record changing phonograph adapted to play either face of a double faced record in a record playing position, a magazine for holding a series of records in adjacent relation to each other, a playing unit mounted adjacent said magazine and including means for rotatably supporting a record in said playing position, means mounting said playing unit and magazine for relative movement, power actuated means for effecting relative movement between said magazine and playing unit, power actuated means associated with said playing unit and magazine for transferring the desired record from said magazine to said supporting means, power actuated means for rotating the record supporting means, reproducing means movable in one direction into engagement with the grooves on one face of the record and in the opposite direction into engagement with the grooves on the other face of the record, power actuated means for moving said reproducing means in said opposite directions to engage the grooves on either face of the record, and actuable selector means corresponding to each side of each record in the magazine and operatively associated with said first and last mentioned power actuated means for controlling the arrestment of said relative motion with a selected record in said magazine in transfer relation with said playing unit and for moving said reproducer in said opposite directions to engage the grooves on either face of the record according to the selector means actuated.

19. In an automatic phonograph, a magazine for supporting a series of double faced disc records, a player unit including means for rotatably supporting a record in a plane, record transfer means, and record reproducing means, said record reproducing means being mounted for movement to either side of said plane to engage and play both faces of a record on said supporting means, power means associated with said unit and magazine for causing relative motion therebetween, two independent stopping means associated with said unit for arresting said relative motion, each stopping means corresponding to a face of a record, and means controlled by both of said independent stopping means for locating said reproducing means successively adjacent both faces of said record to be played.

20. In an automatic phonograph, a magazine for supporting a series of double faced disc records, a playing unit comprising means for supporting and rotating a record in a plane, record transfer means associated with said unit and magazine for removing a record from said magazine to said supporting means, record engaging and playing means associated with said unit and movable to either side of said plane, two displaceable members corresponding to each record in said magazine, means associated with said unit and magazine for causing relative motion between said magazine and playing unit, means movable relative to said members for engaging said members when the latter are displaced to terminate said relative movement, and means associated with said unit for returning one of said members to its non-displaced position after the playing of one side of a record corresponding thereto, said last mentioned means being also operable after the playing of the other side of said record for returning the other of said members to its non-displaced position.

21. In an automatic phonograph, a magazine for supporting a series of double faced disc records, a player unit movable along said magazine and including reversibly rotatable record supporting means defining a record playing position, record transfer means, and record reproducing means adapted to engage and play both faces of a record in said playing position, means associated with said magazine and unit for causing relative motion therebetween, two independently operable record selecting means corresponding to each record in said magazine associated with said unit for arresting said relative motion in a selected record playing position, means controlled by one selecting means for causing said rotatable record supporting means to rotate in one direction and to cause said record reproducing means to engage one face of the corresponding record, and means controlled by the other selecting means for causing the opposite rotation of said rotatable record supporting means and the engagement of the opposite face of said record by said reproducing means.

22. In an automatic phonograph, an elongated stationary magazine having means for supporting a plurality of records in closely spaced face to face relation, a carriage adjacent the magazine, record supporting and rotating means mounted on said carriage for bodily movement therewith, means supporting said carriage for movement along the magazine, and record removing means carried by said carriage and adapted to remove a record from said magazine onto said record supporting and rotating means.

23. In an automatic phonograph, an elongated horizontally disposed stationary magazine having means for supporting a plurality of records in close and vertical face to face relation, a carriage adjacent the magazine, record supporting and rotating means mounted on said carriage for bodily movement therewith, means supporting said carriage for horizontal movement along the magazine, and record removing means carried by said carriage and adapted to remove a record from said magazine onto said record supporting and rotating means.

24. In an automatic phonograph, an elongated stationary magazine having means for supporting a plurality of records in vertical and face to face relation, horizontally disposed carriage supporting means extending along said magazine, a carriage mounted to travel along said supporting means, and record removing means carried by said carriage and adapted to engage the periphery of a record and cause the same to roll from said magazine onto said carriage.

25. In an automatic phonograph comprising a stationary magazine for records, a movable carriage mounted for translatory movement adjacent to and along said magazine, means on the carriage for rotatably supporting a record, transfer means on the carriage for removing a record from the magazine and on to said supporting means, and a pickup movably mounted on said carriage for cooperating with a record supported on said supporting means.

26. In an automatic phonograph, a stationary magazine adapted to support a plurality of double faced disc records, a carriage mounted for translatory movement along said magazine, means on said carriage for supporting and rotating in opposite directions a record in a plane, means associated with said magazine and unit for transferring a record from the magazine to said supporting and rotating means, pickup means on said carriage, and means associated with said pickup means for selectively bringing same into engagement with the playing grooves of the record on either side of said plane.

27. In an automatic phonograph, a stationary magazine for supporting a series of records in closely spaced face to face relation, a playing unit, means including a motor on said unit for supporting and rotating a record in a plane parallel to the records in the magazine, means for moving said playing unit relative to said magazine to bring said record supporting means into alignment with a desired record, said playing unit carrying transfer means operatively associated with said magazine and unit for transferring a selected record from said magazine to said supporting and rotating means, and movable pickup means carried by said unit for engaging and playing said record.

28. In an automatic phonograph, a stationary magazine for supporting a series of disc records, a player unit mounted for movement adjacent to and along said magazine, means for moving said unit relative to said magazine, selector means associated with said unit and magazine for arresting said unit in cooperative relation with any record in the magazine, said unit comprising rotatable record supporting means, record transfer means, record reproducing means, and an electric motor for driving said rotatable record supporting means and unit moving means, all mounted on the unit for uniform translational movement therewith.

29. In an automatic phonograph, a stationary magazine adapted to support a plurality of records, a playing unit mounted for translatory movement along said magazine, said unit including power actuated record transfer means, record supporting and rotating means and record reproducing means all mounted on said unit for bodily movement therewith, power means operatively connected to said unit for moving it along said magazine, power means operatively connected to said transfer, supporting and rotating and reproducing means, and means including selectively operable means associated with said unit, magazine and power means for automatically and sequentially arresting said unit in cooperative relation to desired records in the magazine, and for automatically operating said record transfer, supporting and rotating and reproducing means to remove the selected records from said magazine onto said rotating means for reproduction by said reproducing means and to return reproduced records to the magazine in sequence.

30. In an automatic phonograph, a stationary magazine adapted to support a plurality of double faced disc records, a playing unit mounted for translatory movement along said magazine, said unit including power actuated record transfer means, record supporting and rotating means, and record reproducing means all mounted on said unit for bodily movement therewith, power means operatively connected to said unit for moving it along said magazine, said reproducing means and said supporting and rotating means being mounted on said unit for relative movement in opposite directions and having associated therewith power actuated means for moving same in one of said opposite directions to play one side and in the other of said directions to play the other side of a record, power means connected to said power actuated means, and means including selectively operable means corresponding to each side of each record associated with said unit and magazine for automatically and sequentially arresting said unit in cooperative relation to desired records in the magazine and for automatically operating said record transfer means to remove selected records from said magazine onto said supporting and rotating means and for effecting relative movement between the latter and said reproducing means to reproduce selected sides of selected records.

31. In an automatic phonograph, record supporting and rotating means, record engaging and playing means associated with said record rotating means to play either side of a double faced record on said rotating means, a magazine for supporting a series of double faced disc records in spaced relation to each other, record transfer means cooperatively associated with said magazine and said record supporting and rotating means, said magazine and transfer means being mounted for movement relative to each other, means for effecting said relative movement for aligning said record transfer means and records in said magazine, means for operating said transfer means to transfer a record from said magazine to said rotating means, and means associated with said magazine record transfer means, record supporting and rotating means, and playing means for selecting any record from said magazine and playing both sides of same while the transfer means and magazine remain in the same relative position, said last mentioned means including a pair of selector members operable from a normal position to a displaced position and corresponding to each side of a selected record, means controlled by both selector members for terminating relative movement between said magazine and transfer means with the latter in alignment with the selected record, and for causing the transfer means, operating means and record engaging and playing means to effect operation of the former to transfer the selected record onto said record rotating means and to play both sides of said record in succession.

32. In an automatic phonograph, a stationary magazine for supporting a plurality of double faced disc records in adjacent spaced relation to each other, a playing unit mounted for movement relative to said magazine and including means for rotatably supporting a record in a record playing position, means associated with said unit for moving and stopping said unit in cooperative relation with any desired record in said magazine, means associated with said magazine and playing unit for transferring the desired record from said magazine to said rotatable supporting means, reproducing means movable in one direction into engagement with the playing grooves on one face of the record being rotated and in the opposite direction into engagement with the grooves on the other face of the record, and power actuated means for selectively moving said reproducing means in said opposite directions to engage the grooves on either face of the record.

33. In an automatic phonograph, a stationary magazine supporting a series of double faced disc records in parallel vertical relation, carriage supporting means extending along said magazine, a carriage movably mounted on said supporting means, means on said carriage for rotating a record in a plane, means on said carriage for transferring a record from said magazine to said rotating means and back to said magazine, pickup means on said carriage bodily movable from one side to the other side of said plane to play either face of a record on said rotating means, means for moving said pickup means from one side of said plane to the other, power means driving said carriage along said magazine, and displaceable selector means corresponding to each face of each record associated with said carriage, magazine, and pickup moving means for arresting said carriage in record selective relation with said magazine and for moving said pickup means to engage either face of any record selected.

34. In an automatic phonograph, an elongated stationary magazine having means for supporting a plurality of records in vertical and face to face relation, horizontally disposed carriage supporting means extending along said magazine, a carriage mounted to travel along said supporting means, a plurality of operable members corresponding to magazine record positions adapted selectively to be operated to arrest said carriage in cooperative relation with corresponding records, record removing means carried by said carriage and adapted to remove records from said magazine onto said carriage, and means associated with said carriage for returning said operable members to non-operated position.

35. In an automatic phonograph, a stationary magazine for supporting a series of disc records in face to face relation, a carriage movable along said magazine and equipped with rotatable supporting means and carriage stopping means, a series of displaceable selector bars, each of said bars being located adjacent said carriage at a point in proximity to a corresponding record in said magazine, said bars being adapted when displaced to engage said carriage stopping means to stop said carriage with said rotatable record supporting means in alignment with the corresponding selected record in said magazine.

36. In an automatic phonograph, a stationary magazine for supporting a series of disc records in vertical and face to face relation, a carriage mounted for movement adjacent to and along said magazine, said carriage being equipped with rotatable record supporting means adapted to support a record in parallel relation to the records in said magazine, power means driving said carriage along said magazine, displaceable selector means associated with said magazine and carriage for arresting said carriage with said record supporting means in substantial alignment with one of said records, and automatic means associated with said carriage and magazine for rolling a record from said magazine into operative relation with said record supporting means and back to said magazine.

37. In an automatic phonograph, a movable player unit including record rotating and supporting means, record playing means, and record transfer means, a stationary magazine adjacent said unit for supporting a series of double faced disc records in a vertical position in face to face relation, said magazine comprising essentially two bar members upon which the peripheries of the records rest with spacer members between adjacent records, power means associated with said unit for causing said player unit to move along said magazine in a direction substantially perpendicular to the planes of the records therein, and record selecting means associated with said unit for stopping said player unit in playing alignment with any record in said magazine, said selecting means comprising a member carried by said player unit and two displaceable bar members for each record movable into the path of said first mentioned member, and means controlled by each bar member for effecting the playing of one face of the corresponding double faced record.

38. In an automatic phonograph for playing both sides of a plurality of records, means for supporting a plurality of records, a pair of operable selector members in vertical alignment for each record, a carriage movable adjacent said supporting means, an abutment thereon for engaging said selector means when operated, said abutment being resilient so as to be displaced by engagement with said selector means, a member associated with said carriage for selectively controlling the playing of one side or the other side of a record, means associated with the controlling member for elevating same above the abutment so as to rest thereon, whereby the controlling member drops to a certain extent into engagement with one or the other of said selector means when the abutment is displaced by engagement with one or both of said selector means.

39. In an automatic phonograph, a stationary magazine for supporting a plurality of records in adjacent spaced relation to each other, a playing unit movably mounted adjacent said magazine, means associated with said unit for moving and stopping said unit in cooperative relation with any desired record in said magazine, said player unit having movable means for engaging and removing the desired record from said magazine, said record removing means having a normal position clear of the records in said magazine, and individual means on said magazine corresponding to each record position therein and cooperating with said record removing means for positioning said playing unit with said record removing means in close alignment with a corresponding record.

40. In an automatic phonograph, a magazine comprising two spaced supporting members for supporting a series of disc records in vertical position by peripheral contact, a playing unit adjacent said magazine including means for rotating and supporting a record in a vertical plane playing position, record transfer means associated with said unit and magazine and mounted for movement in said plane to engage the peripheral edge of a record between said members, record engaging and playing means associated with said unit, means associated with said magazine and playing unit for causing relative motion therebetween, record selecting means associated with said last mentioned means for arresting said motion with said transfer means in alignment with a desired record in said magazine, means for moving said transfer means to engage the exposed peripheral portion of a selected record between said supporting members and roll said record on its periphery out of said magazine, means associated with said transfer means for stopping the record in substantial vertical alignment with said playing position, and means also associated with said transfer means for raising said record into said playing position.

41. In an automatic phonograph, a magazine having members for supporting records of different diameters in vertical positions by peripheral contact with said members and with portions of the peripheries of the records exposed, a playing unit adjacent said magazine including means for supporting and rotating a record in a vertical plane playing position, record transfer means associated with said magazine normally out of contact with said records and mounted for movement to engage the peripheries of said records, record engaging and playing means associated with said unit, record selecting means associated with said magazine and unit for effecting alignment between said record transfer means and a record in said magazine, means for moving said transfer means on its mounting to engage the lower exposed peripheral portion of either diameter record and to roll it on its periphery out of said magazine, means associated with said transfer means to stop said record in substantial vertical alignment with said playing position, resilient means associated with said transfer means for raising a transferred record into said playing position, and means on said rotating and supporting means for securing said record in said playing position for rotation in said plane.

42. In an automatic phonograph, a stationary magazine for supporting a series of records vertically in closely spaced face to face relation, two spaced supporting members extending the length of said magazine substantially perpendicular to the plane of the records therein, spacing means separating each record from the next in said magazine, a single arm mounted for movement relative to the magazine for removing records from the magazine for playing, selective means associated with said arm for effecting alignment thereof with any desired record in said magazine, means associated with said arm for causing same to rise into contact with said record between said supporting members and adjacent one of said members to force said record out of said magazine and around and over the other of said supporting members.

43. In an automatic phonograph, a magazine, a player carriage mounted for movement along the magazine, a record transfer arm movably mounted on said carriage and movably mounted for removing a record from said magazine, a record receiving arm on said carriage and cooperatively associated with said transfer arm for receiving said record and returning same to the magazine, a third arm in opposed relation to said receiving arm, and means interconnecting the third arm and the receiving arm whereby the receiving arm may be elevated by elevating the third arm.

44. In an automatic phonograph, means for supporting and rotating double faced disc records of different diameters in a playing position, means associated with said supporting means for supplying records thereto, record engaging and playing means movably mounted adjacent said supporting means for movement in opposite directions to engage opposite faces of a record in said playing position, means associated with said last mentioned means for moving same in opposite directions to engage either face of said record for playing the same, means also associated with last mentioned means for locating said engaging and playing means at the initial playing position on either face of a record of large diameter, and means controlled by said supplying means for locating said engaging and playing means at the initial playing position of a record of smaller diameter.

45. In an automatic phonograph, means for supporting and rotating double faced disc records of different diameters in a playing position, means associated with said supporting means for supplying records thereto, record engaging and playing means movably mounted adjacent said supporting means for movement in opposite directions to engage opposite faces of a record in said playing position, means associated with said last-mentioned means for moving same in opposite directions to engage either face of said record for playing the same, means also associated with said last-mentioned means for normally locating said engaging and playing means at the initial playing position on either face of a record of one diameter and means controlled in response to the size of the record supplied to the supporting and rotating means for locating said engaging and playing means at the initial playing position of a record of another diameter.

46. In an automatic phonograph, means for supporting and rotating double faced disc records in a plane, playing means associated with said supporting means for engaging and playing both faces of said record, said playing means being mounted for swinging movement around a single axis normal to said plane by the record grooves from one edge of said record toward the center on one side of said plane and from the opposite edge toward the center on the opposite side of said plane, record changing mechanism associated with said supporting and rotating means for supplying records thereto and removing them therefrom, and trip means movable with said playing means for starting the record changing mechanism when said playing means is moved on its mounting when playing either side of a record to a position adjacent the center of a record rotating in said plane.

47. In an automatic phonograph, in combination, a revolving record support, a reversible electrical motor operatively connected to said record support for selectively rotating said support in either direction, associated phonograph operating mechanism including rotatable means driven from said motor, automatic coupling means between said motor and said associated rotatable means for rotating last said means in the same direction while said motor is running in either direction, and record changing mechanism actuated by said rotatable means and cooperatively associated with said support for supplying records to said record support.

48. In an automatic phonograph, a revolving record support, power means associated with said support for driving same, means associated with said power means for reversing the direction of rotation of said support, automatic coupling means operatively connected to said revolving record support, including a shaft, two gears loosely mounted on said shaft, and a coil spring around said shaft associated with each gear, whereby the rotation of the shaft in one direction locks one gear to the shaft and frees the other gear and rotation of the shaft in the opposite direction frees the said one gear and locks the said other gear to the shaft, a driving gear meshing with and driven in the same direction by both said gears, phonograph operating mechanism including associated rotatable means driven in a single direction by said driving gear, and means actuated by said rotatable means for supplying records to be played to said record support.

49. In an automatic phonograph, a stationary magazine for supporting a plurality of records in vertical face to face relation, a carriage mounted for horizontal translatory movement along said magazine, a motor mounted on said carriage, record supporting and rotating means, record transfer means and record playing means all mounted on said carriage, a horizontally disposed shaft mounted on the carriage for rotating said record supporting means, means including reduction gearing connecting said shaft to said motor, a cam shaft on said carriage for actuating the record transfer means and recording playing means, means including reducing gears for connecting said horizontally disposed shaft to said cam shaft, and means including reducing gears for driving said carriage relative to the magazine from said horizontally disposed shaft.

50. In an automatic phonograph, a magazine unit for supporting a series of records, a record playing unit adjacent thereto, and means for moving said units relative to one another, said means including a pair of spaced parallel members having contact surfaces extending in the direction of said relative movement and being fixedly mounted relative to one of said units, and driving means mounted on the other unit, said driving means including a driven shaft located between said parallel members, driven means mounted for planetary movement around said drive shaft and adapted to contact the surfaces of one or the other of said parallel members, the opposed effective contact surfaces of said parallel members having a length substantially equal to that of the magazine and one contact surface terminating at one limit of relative motion, and the other at the opposite limit of relative motion, whereby said driven means is rotatable from contact with one of said surfaces into contact with the other at opposite ends of the magazine to reverse the direction of relative movement.

51. In an automatic phonograph, a horizontal record supporting shaft having a bore at one end, said shaft being rotatable and also movable axially in opposite directions, means for rotating said shaft, a record support mounted on said shaft for movement therewith adjacent said end and adapted to engage one side of a record in a vertical position when said shaft is moved in one direction, a record centering pin mounted for axial movement in said bore, a second record support adapted to engage the opposite side of a record whereby a record is clamped between said supports upon axial movement of said shaft in said one direction and released upon movement of the shaft in the opposite direction, means for axially moving said centering pin from said bore into a record opening when said shaft is moved in said one direction, and means for returning said pin into said bore when said shaft is moved in the opposite direction.

52. In a phonograph, rotatable means for rotating a record in a plane for reproduction, a player arm associated with said first-mentioned means and pivotally supported on an axis substantially parallel to said plane, counterbalance means on said player arm for counterbalancing the latter about said axis, means associated with said player arm and said counterbalance means for moving them from one side to the other side of said plane, and resilient means biasing the player arm towards the record in both positions of the player arm.

53. In a phonograph, rotatable means for rotating a record in a plane for reproduction, a player arm associated with said first mentioned means and pivotally mounted on an axis substantially parallel to said plane and on an axis substantially perpendicular to said plane, counterbalance means operatively connected to said player arm for counterbalancing the latter about said first axis, counterbalance means operatively connected to said player arm for counterbalancing the latter about said second axis, means for moving said player arm and said first counterbalance means from one side to the other of said plane, and resilient means biasing the player arm towards the record in both positions of the player arm.

54. In a phonograph, rotatable means for rotating a record in a plane for reproduction, pickup means associated with said first means for engaging and reproducing a record on both sides when rotated in said plane, said pickup means being pivotally mounted on two axes, one of which is substantially parallel to and the other substantially perpendicular to said plane, and counterbalance means operatively connected to said pickup means for counter-balancing same about both said axes.

55. In an automatic phonograph, a stationary magazine for supporting a series of disc records, a player unit comprising a rotatable record supporting means, record transfer means, and record reproducing means, said player unit being mounted for translatory movement adjacent said magazine, power means associated with said unit for causing the same to travel along said magazine, and automatic means associated with said unit and power means and effective when the player unit is at either end of said magazine for reversing the direction of travel of said unit.

56. In an automatic phonograph, means for supporting double faced disc records in a plane with both faces exposed, means including an electric motor for rotating said supporting means in opposite directions, playing means associated with said supporting means for engaging and playing both faces of said record, said playing means being mounted for swinging movement around a single axis normal to said plane by the record grooves from one edge of said record toward the center on one side of said plane and from the opposite edge toward the center on the opposite side of said plane, said means being also mounted for movement in one direction into engagement with one side of a record and in the opposite direction into engagement with the other side of a record to play both sides of a record, record changing means associated with said supporting and rotating means for supplying records thereto and removing them therefrom, means operatively connecting said record changing means to said motor for operation thereby, means operated by the motor and associated with said playing means to move the latter in either of said two directions to engage and play either side of the record, and trip means movable with said playing means for effecting operation of the record changing mechanism by the motor and for effecting movement of the playing means out of engagement with the record by the motor when said playing means reaches a position adjacent the ends of the playing grooves when playing either side of a record.

57. In an automatic phonograph, means for supporting double faced disc records in a plane with both faces exposed, means including an electric motor for rotating said supporting means in opposite directions, playing means associated with said supporting means for engaging and playing both faces of said record, said playing means being mounted for swinging movement around a single axis normal to said plane by the record grooves on either side of said plane, said means being also mounted for movement in one direction into engagement with one side of a record and in the opposite direction into engagement with the other side of a record to play both sides of a record, automatic record changing means associated with said supporting and rotating means for supplying records thereto and removing them therefrom, means operatively connecting said record changing means to said motor for operation thereby, means operated by the motor and associated with said playing means to move the latter in either of said two directions to engage and play either side of the record, and common trip actuating means movable with said playing means around said single axis and associated with said motor and record changing mechanism for first effecting movement of the playing means out of engagement with the record by the motor, and for thereafter effecting operation of the record changing mechanism by the motor when said playing means reaches a position adjacent the ends of the playing grooves when playing either side of a record.

58. In an automatic phonograph, in combination, a magazine, means for rotatably supporting a record in playing position with the recording grooves on each side exposed, means for rotating said supporting means in either direction, reproducing means adapted to cooperate with one side of a record in said position or with the other side of said record, automatic trip means adapted to be actuated by said reproducing means at the end of the playing of a recording on either side of a record, and power means adapted to be put into operation by the actuation of said trip means for removing said record from said position to said magazine.

59. In an automatic phonograph, in combination, record supporting means adapted rotatably to support records in a single playing plane with the recording grooves on both sides exposed, power actuated transfer mechanism for effecting the transfer of records from said record supporting means, pickup means, a support for said pickup means movable about an axis perpendicular to said playing plane whereby said pickup means follows the record grooves when moved into contact therewith, means mounting said pickup means on said support for pivotal movement toward and away from said record playing plane in opposite directions on opposite sides of said plane whereby said pickup means is movable into contact with the record grooves on one side or the other of said plane, power actuated means for effecting pivotal movement of the pickup means toward and away from said playing plane, a trip actuating member mounted on and movable with said pickup means support about said perpendicular axis, trip means actuated by said actuating member when the center of a record is approached by the pickup means in contact with the record grooves, and power means controlled by said trip means for effecting movement of said power actuated means to move the pickup means out of contact with the record grooves when it approaches the center of a record and for effecting operation of said transfer mechanism.

EDWARD F. ANDREWS.